(12) United States Patent
Ippolito et al.

(10) Patent No.: US 8,965,719 B1
(45) Date of Patent: Feb. 24, 2015

(54) UNIVERSAL PERFORMANCE MONITOR FOR POWER GENERATORS

(75) Inventors: David Ippolito, Glen Mills, PA (US); David Kucharczuk, Chadds Ford, PA (US)

(73) Assignee: Versify Solutions, Inc., Glen Mills, PA (US)

( * ) Notice: Subject to any disclaimer, the term of this patent is extended or adjusted under 35 U.S.C. 154(b) by 494 days.

(21) Appl. No.: 12/399,689

(22) Filed: Mar. 6, 2009

Related U.S. Application Data

(60) Provisional application No. 61/034,912, filed on Mar. 7, 2008.

(51) Int. Cl.
G01R 27/02 (2006.01)
G01R 15/12 (2006.01)
G06F 3/05 (2006.01)
G06F 13/14 (2006.01)

(52) U.S. Cl.
USPC .............. 702/62; 702/64; 702/179; 702/188

(58) Field of Classification Search
USPC ............ 702/37, 62, 64, 116, 117, 127, 150, 702/179, 188; 707/803; 709/217, 224
See application file for complete search history.

(56) References Cited

U.S. PATENT DOCUMENTS

| | | | |
|---|---|---|---|
| 5,964,879 A | 10/1999 | Dunstan et al. | |
| 6,021,402 A | 2/2000 | Takriti | |
| 6,473,744 B1 | 10/2002 | Tuck et al. | |
| 6,633,823 B2 | 10/2003 | Bartone et al. | |
| 6,925,385 B2 * | 8/2005 | Ghosh et al. | 702/14 |
| 7,020,701 B1 * | 3/2006 | Gelvin et al. | 709/224 |
| 7,142,949 B2 | 11/2006 | Brewster et al. | |
| 7,162,444 B1 | 1/2007 | Machado et al. | |
| 7,233,843 B2 * | 6/2007 | Budhraja et al. | 700/291 |
| 7,246,156 B2 * | 7/2007 | Ginter et al. | 709/217 |
| 7,274,975 B2 | 9/2007 | Miller | |
| 7,305,281 B2 | 12/2007 | Scott et al. | |
| 7,333,880 B2 | 2/2008 | Brewster | |
| 7,398,194 B2 | 7/2008 | Evans et al. | |
| 7,565,227 B2 | 7/2009 | Richard et al. | |
| 7,612,466 B2 | 11/2009 | Skutt | |
| 7,747,739 B2 | 6/2010 | Bridges et al. | |
| 7,752,106 B1 | 7/2010 | Corby et al. | |

(Continued)

OTHER PUBLICATIONS

USPTO—U.S. Appl. No. 12/437,388—Final Office Action—Issued on Jun. 13, 2013.

(Continued)

*Primary Examiner* — Eliseo Ramos Feliciano
*Assistant Examiner* — Felix Suarez
(74) *Attorney, Agent, or Firm* — Morgan, Lewis & Bockius LLP

(57) ABSTRACT

The invention broadly encompasses a system including a communications network, a plurality of remotely located data sources to provide power data, the power data including quantitative and qualitative data of one or more power generation units, and a performance monitor in communication with the plurality of remotely located data sources through the communications network, the performance monitor including a communications unit to extract the power data from the plurality of remotely located data sources, a data conversion unit to transform the power data into a common data format, a data store to store the transformed power data, and a user interface unit to display the transformed power data on one or more client devices through the communications network.

19 Claims, 24 Drawing Sheets

(56) References Cited

U.S. PATENT DOCUMENTS

| | | | |
|---|---|---|---|
| 7,840,607 B2 * | 11/2010 | Henigman et al. | 707/803 |
| 7,844,370 B2 | 11/2010 | Pollack et al. | |
| 7,844,439 B2 * | 11/2010 | Nasle et al. | 703/18 |
| 7,873,441 B2 | 1/2011 | Synesiou et al. | |
| 7,873,442 B2 | 1/2011 | Tsui | |
| 7,877,235 B2 | 1/2011 | McConnell et al. | |
| 7,885,917 B2 | 2/2011 | Kuhns et al. | |
| 7,925,552 B2 | 4/2011 | Tarbell et al. | |
| 7,930,070 B2 | 4/2011 | Imes | |
| 8,019,697 B2 | 9/2011 | Ozog | |
| 8,068,938 B2 | 11/2011 | Fujita | |
| 8,200,370 B2 | 6/2012 | Paik | |
| 8,532,836 B2 | 9/2013 | Schmid et al. | |
| 2002/0123974 A1 | 9/2002 | Kurokawa et al. | |
| 2002/0147670 A1 | 10/2002 | Lange | |
| 2003/0055776 A1 | 3/2003 | Samuelson | |
| 2003/0163224 A1 | 8/2003 | Klaar et al. | |
| 2003/0182250 A1 | 9/2003 | Shihidehpour et al. | |
| 2004/0024483 A1 | 2/2004 | Holcombe | |
| 2005/0004858 A1 | 1/2005 | Foster et al. | |
| 2005/0027636 A1 | 2/2005 | Gilbert et al. | |
| 2005/0125104 A1 | 6/2005 | Wilson et al. | |
| 2005/0165511 A1 | 7/2005 | Fairlie | |
| 2005/0171704 A1 | 8/2005 | Lewis et al. | |
| 2005/0197742 A1 | 9/2005 | Scott et al. | |
| 2005/0234600 A1 | 10/2005 | Boucher et al. | |
| 2006/0047369 A1 | 3/2006 | Brewster et al. | |
| 2006/0155423 A1 | 7/2006 | Budike | |
| 2006/0259199 A1 | 11/2006 | Gjerde et al. | |
| 2007/0124026 A1 | 5/2007 | Troxell et al. | |
| 2007/0220907 A1 | 9/2007 | Ehlers | |
| 2007/0271173 A1 | 11/2007 | Johnson et al. | |
| 2008/0049013 A1 | 2/2008 | Nasle | |
| 2008/0091580 A1 | 4/2008 | Kremen | |
| 2008/0167756 A1 | 7/2008 | Golden et al. | |
| 2008/0177678 A1 | 7/2008 | Di Martini et al. | |
| 2009/0083167 A1 | 3/2009 | Subbloie | |
| 2009/0088991 A1 | 4/2009 | Brzezowski et al. | |
| 2009/0187284 A1 | 7/2009 | Kreiss et al. | |
| 2009/0187499 A1 | 7/2009 | Mulder et al. | |
| 2009/0281674 A1 | 11/2009 | Taft | |
| 2010/0064001 A1 | 3/2010 | Daily | |
| 2010/0076835 A1 | 3/2010 | Silverman | |
| 2010/0145532 A1 | 6/2010 | Gregory et al. | |
| 2010/0179862 A1 | 7/2010 | Chassin et al. | |
| 2010/0250590 A1 | 9/2010 | Galvin | |
| 2011/0060476 A1 | 3/2011 | Iino et al. | |
| 2011/0202192 A1 | 8/2011 | Kempton | |
| 2011/0282511 A1 | 11/2011 | Unetich | |
| 2012/0065805 A1 | 3/2012 | Montalvo | |
| 2012/0271686 A1 | 10/2012 | Silverman | |

OTHER PUBLICATIONS

USPTO—U.S. Appl. No. 13/556,535—Non-Final Office Action—Issued on Feb. 22, 2013.

USPTO—U.S. Appl. No. 12/430,515—Final Office Action—Issued on Mar. 12, 2013.

Li, Guang, "Day-Ahead Electricity Price Forecasing in a Grid Environment," IEEE Transactions on Power Systems, vol. 22, No. 1, Feb. 2007.

Feng, Xiaoming et al., "A new breed of software tool for integrated electrical power system and market analysis-GridView," Power Engineering Society Summer Meeting, 2002 IEEE, vol. 2, 25-25, pp. 737-743, Jul. 2002.

Wang, Hui-Fung Francis, "Power Systems Locational Marginal Pricing in Deregulated Markets," A dissertation, Tulane University, 2003.

Yang, Jian, "A market monitoring system for the open electricity markets," Power Engineering Society Summer Meeting, IEEE, vol. 1, pp. 235-240, 2001.

Hong, Ying-Yi, et al., "A neuro-fuzzy price forecasting approach in deregulated electricity markets," Electrical Power Systems Research, vol. 73, pp. 151-157, 2005.

Henderson, M. et al., "Planning for reliability, economics, and the environment in a deregulated market," Power and Energy Society General Meeting—Conversion and Delivery of Electrical Energy in the 21 st Century, 2008 IEEE, pp. 1-9, Jul. 20-24, 2008.

USPTO Office Action dated Apr. 23, 2014 in related technology U.S. Appl. No. 13/556,535.

* cited by examiner

| Dispatch Date | HE | ZZZ Schedule MW | ZZZ Loss | ZZZ Loss MW | YYY Schedule MW | YYY Loss % | YYY Loss Mw | Total Output Required MW | Plant Net | Difference | Plant Fuel | Plant Heat Rate | Ambient Temp Deg.F |
|---|---|---|---|---|---|---|---|---|---|---|---|---|---|
| 12/27/2007 | 1 | | 1.5 | | | 5 | | | 3 | 3 | | | 35.8 |
| 12/27/2007 | 2 | | 1.5 | | | 5 | | | -2.1 | -2.1 | | | 35.2 |
| 12/27/2007 | 3 | | 1.5 | | | 5 | | | -2.1 | -2.1 | | | 36.5 |
| 12/27/2007 | 4 | | 1.5 | | | 5 | | | -2.1 | -2.1 | | | 35.5 |
| 12/27/2007 | 5 | 25 | 1.5 | .4 | | | | | 4 | -3.4 | 216 | -63.811 | 34.2 |
| 12/27/2007 | 6 | 225 | 1.5 | 3.4 | | | | | 89 | -.2 | 413 | 16.67 | 33.1 |
| 12/27/2007 | 7 | 250 | 1.5 | 3.8 | | | | | .4 | -13.6 | 1887 | 8.802 | 32 |
| 12/27/2007 | 8 | 450 | 1.5 | 6.8 | | | | | .2 | 10.2 | 2248 | 8.507 | 33.1 |
| 12/27/2007 | 9 | 450 | 1.5 | 6.8 | | | | | .7 | -9.3 | 3132 | 6.996 | 35.2 |
| 12/27/2007 | 10 | 450 | 1.5 | 6.8 | | | | | 7 | | 3302 | 7.225 | 37 |
| 12/27/2007 | 11 | 450 | 1.5 | 6.8 | | | | | .9 | | 3138 | 6.966 | 36.2 |
| 12/27/2007 | 12 | 450 | 1.5 | 6.8 | | | | | 7 | -.1 | 3281 | 7.201 | 39.3 |
| 12/27/2007 | 13 | 450 | 1.5 | 6.8 | | | | | 7 | | 3175 | 6.948 | 48.2 |
| 12/27/2007 | 14 | 450 | 1.5 | 6.8 | | | | | 7 | | 3286 | 7.191 | 41.2 |
| 12/27/2007 | 15 | 450 | 1.5 | 6.8 | | | | | 7 | | 3181 | 6.961 | 42.6 |
| 12/27/2007 | 16 | 450 | 1.5 | 6.8 | | | | | 7 | | 3173 | 6.944 | 42.5 |
| 12/27/2007 | 17 | 450 | 1.5 | 6.8 | | | | | 7 | | 3286 | 7.191 | 40.1 |
| 12/27/2007 | 18 | 450 | 1.5 | 6.8 | | | | | 7 | | 3183 | 6.965 | 35.8 |
| 12/27/2007 | 19 | 450 | 1.5 | 6.8 | | | | | 7 | | 3279 | 7.174 | 34.8 |
| 12/27/2007 | 20 | 450 | 1.5 | 6.8 | | 5 | | 457 | 456.9 | -.1 | 3176 | 6.955 | 33.6 |
| 12/27/2007 | 21 | 450 | 1.5 | 6.8 | | 5 | | 457 | 457 | | 3286 | 7.19 | 32.9 |
| 12/27/2007 | 22 | 450 | 1.5 | 6.8 | | 5 | | 457 | 447.6 | -9.8 | 3170 | 7.089 | 31.8 |
| 12/27/2007 | 23 | 200 | 1.5 | 3 | | 5 | | 203 | 221.6 | 8.8 | 1652 | 7.809 | 31.3 |
| 12/27/2007 | 24 | 200 | 1.5 | 3 | | 5 | | 203 | 195.9 | -7.1 | 1467 | 7.468 | 30.8 |
| TOTAL | | 7200 | | 108 | | | | 7311 | 7282.9 | -28.1 | | 7.276 | |

Daily Reports
Daily Summary
Day Forecasted Availability
Daily Log
Trading Summary

| Station/Unit | Temp | HR | Scheduled MW | Actual MW | nox (lbs/hr) | CO (lbs/hr) | O2 (%) |
|---|---|---|---|---|---|---|---|
| Sample | 57.53315 | 7220.496 | 457 | 456.828 | 10.445196 | 19.98221964 | 16.965087915 |
| Sample CT1A | 57.53315 | | | 153.2184 | 1.999554 | 0.01491964 | 13.91466 |
| Sample CT1B | 57.53315 | | | 154.4512 | 8.456642 | 19.9673 | 0.01551583 |
| Sample ST1 | 57.53315 | | | 150.7081 | | | |

Technology
BWR
CCGT
CCGT Steam
Diesel
Fluidized Bed
Combustion
Fossil Steam
Gas Turbine
Geothermal
Hydro
Jet
Pumped Storage
PWR
Wind Turbine

FIG. 11A

UNIVERSAL PERFORMANCE MONITOR FOR POWER GENERATORS

This application claims the benefit of U.S. provisional patent application No. 61/034,912, which was filed on Mar. 7, 2008 and is incorporated herein by reference in its entirety.

I. FIELD OF THE INVENTION

The invention encompasses a performance monitor for power generators, and more particularly to a performance monitor for power generators that is adaptable to handle data from any data source.

II. BACKGROUND OF THE INVENTION

The power industry has been rapidly changing with the advent of deregulation as well as other socio-economic factors. As a result, increases in efficiency and control of power generation costs are becoming of more importance. To meet the industry needs, a large number of siloed information technology (IT) applications have been introduced. However, these applications are typically not built with integration in mind with each application being too proprietary in nature and specifically tailored for a particular power generation operation. Accordingly, collection and integration of data from these applications and systems are extremely difficult outside of the intended operation. Many utilities have sought to create a large scale data warehouse to solve this integration problem with very little success.

Another difficulty with prior art systems is the disparate number of locations even within the organization that needs access to the data. For example, within a power company, traders on a central trade floor, plant personnel at each power plant, engineers stationed regionally, management dispersed throughout the organization, and third parties all need access to the data in some form. The traditional siloed applications are typically client-server based applications and it is difficult to provide access to everyone in need of the data.

In addition, due to the generally isolated nature of the prior art systems as described above, combining qualitative event type data (e.g., real-time or recorded plant operations data) and quantitative data (e.g., Supervisory Control and Data Acquisition (SCADA) and market data) becomes difficult and cumbersome, if not impossible, due to the size and disparity of the data. On the other hand, such information is important in determining proper operation of power generation as back office settlement activities determine penalties associated with under or over production of power, for example. Typically, back office personnel manually extract data from a number of different IT systems in the organization to determine the activities that occurred in prior reporting periods. Many times, logs maintained in word processing or hand written documents must be searched manually.

Moreover, when a type of report is required, IT developers have to develop some level of custom code to extract data from the data and format the data properly onto a report. This task becomes even more complicated when disparate data sources with varying data formats are used.

III. SUMMARY OF THE INVENTION

Accordingly, the invention encompasses a system and method for monitoring power generation operations that substantially overcomes the limitations and disadvantages of the related art.

In one embodiment, the invention encompasses a system and method for collecting power generation operation data from disparate data sources and generating a report of the performance of the operation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a system encompasses a communications network, a plurality of remotely located data sources to provide power data, the power data including quantitative and qualitative data of one or more power generation units, and a performance monitor in communication with the plurality of remotely located data sources through the communications network, the performance monitor including a communications unit to extract the power data from the plurality of remotely located data sources, a data conversion unit to transform the power data into a common data format, a data store to store the transformed power data, and a user interface unit to display the transformed power data on one or more client devices through the communications network.

In one embodiment, the invention encompasses methods of communicating with a plurality of remotely located data sources from a performance monitor via a communications network, the plurality of remotely located data sources providing power data including quantitative and qualitative data of one or more power generation units, extracting the power data from the plurality of remotely located data sources, transforming the extracted power data into a common data format, storing the transformed power data in a data store, and displaying the transformed power data on one or more client devices through the communications network.

It is to be understood that both the foregoing general description and the following detailed description are exemplary and explanatory and are intended to provide further explanation of the invention as claimed.

IV. BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 describes a block diagram illustrating an overall system architecture of an exemplary embodiment of the present invention;

FIGS. 6A and 6B show exemplary embodiments of a daily report interface in accordance with the present invention;

FIGS. 7A and 7B show exemplary embodiments of a unit performance report interface in accordance with the present invention;

FIG. 8 illustrates an exemplary unit interface in accordance with the present invention;

FIG. 10 illustrates an exemplary event log interface in accordance with the present invention; and FIGS. 11A and 11B illustrate an exemplary real time monitor in accordance with the present invention.

V. DETAILED DESCRIPTION OF THE INVENTION

General Description

Figure 1:
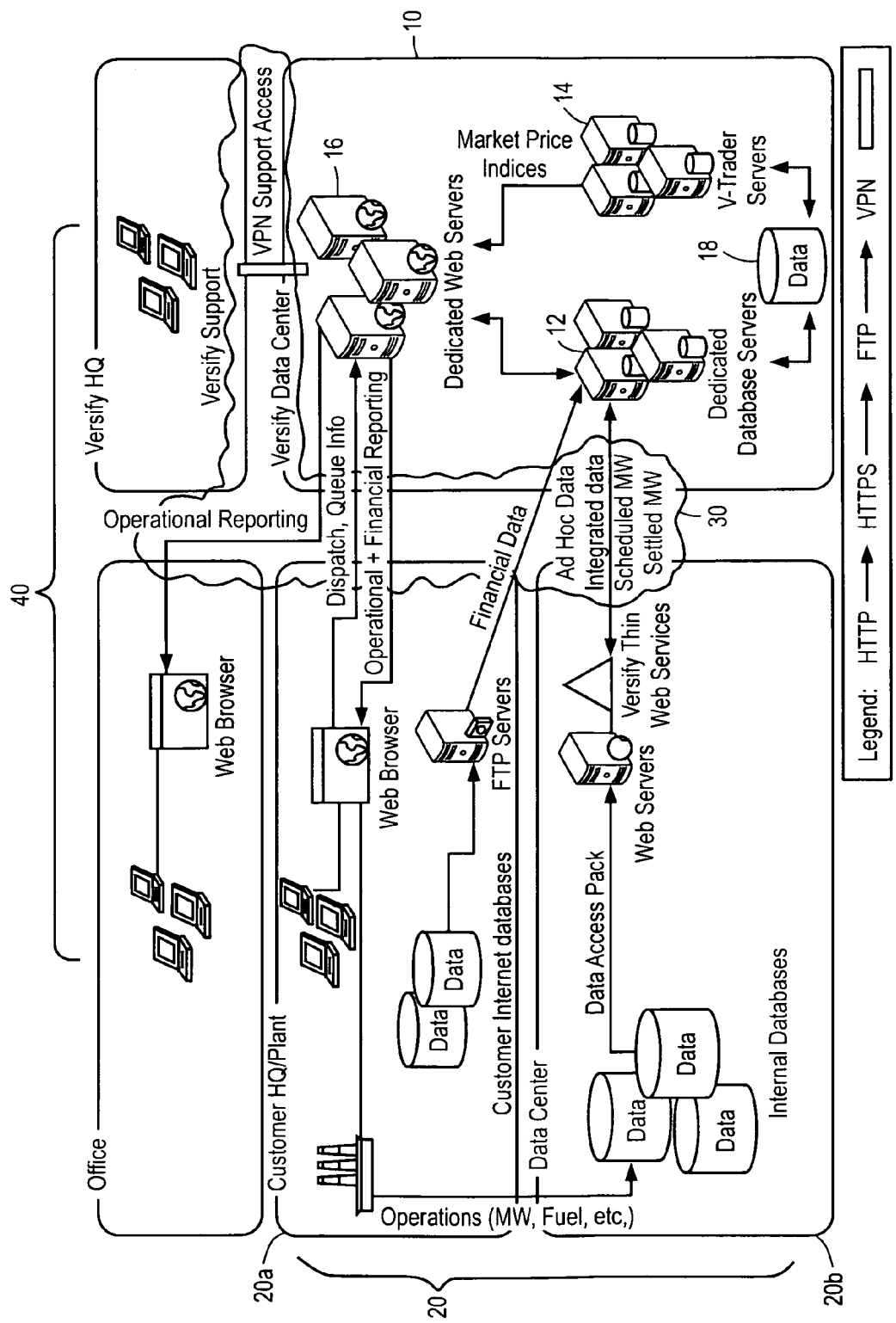

The invention generally encompasses systems including:

a communications network;

a plurality of remotely located data sources to provide power data, the power data including quantitative and qualitative data of one or more power generation units; and a performance monitor in communication with the plurality of remotely located data sources through the communications network, the performance monitor including a communications unit to extract the power data from the plurality of remotely located data sources, a data conversion unit to transform the power data into a common data format, a data store to store the transformed power data, and a user interface unit to display the transformed power data on one or more client devices through the communications network.

In certain illustrative embodiments, the quantitative data includes supervisory control and data acquisition (SCADA) data and/or market data.

In certain illustrative embodiments, the quantitative data includes operational cost data of the one or more power generation units.

In certain illustrative embodiments, the qualitative data includes event log data of the one or more power generation units.

In certain illustrative embodiments, the communications unit includes a gateway application programming interface (API) unit to pull the power data from the plurality of remotely located data sources.

In certain illustrative embodiments, the conversion unit includes an interface API unit to communicate with the gateway API unit and to transform the power data into the common data format.

In certain illustrative embodiments, the user interface unit includes an alarm unit to issue and track alarms based on user-defined events.

In certain illustrative embodiments, the user interface unit includes a reporting unit to display interactive reports on the one or more client devices.

In certain illustrative embodiments, the reporting unit includes any one of a dashboard reporting interface, daily operational reporting interface, unit performance interface, ad-hoc SCADA query interface, and unit status communications interface.

In certain illustrative embodiments, the user interface unit includes a library of extensible markup language (XML) configuration files, each XML configuration file being associated with a corresponding one of the interactive reports to map the power data stored in the data store directly to the corresponding interactive report for display on the one or more client devices.

In other embodiments the invention encompasses computer-implemented methods including communicating with a plurality of remotely located data sources from a performance monitor via a communications network, the plurality of remotely located data sources providing power data including quantitative and qualitative data of one or more power generation units;

extracting the power data from the plurality of remotely located data sources;

transforming the extracted power data into a common data format;

storing the transformed power data in a data store; and displaying the transformed power data on one or more client devices through the communications network.

In certain illustrative embodiments, the quantitative data includes supervisory control and data acquisition (SCADA) data and/or market data.

In certain illustrative embodiments, the quantitative data includes operational cost data of the one or more power generation units.

In certain illustrative embodiments, the qualitative data includes event log data of the one or more power generation units.

In certain illustrative embodiments, the step of extracting the power data from the remotely located data sources include pulling the power data from the plurality of remotely located data sources via a gateway application programming interface (API) unit.

In certain embodiments, the step of transforming the power data includes converting the power data into the common data format via an interface API unit.

In certain illustrative embodiments, the step of displaying includes issuing and tracking alarms based on user-defined events.

In certain illustrative embodiments, the step of displaying includes displaying interactive reports on the one or more client devices.

In certain illustrative embodiments, the interactive reports are displayed on any one of a dashboard reporting interface, daily operational reporting interface, unit performance interface, ad-hoc SCADA query interface, and unit status communications interface.

In certain illustrative embodiments, the step of displaying includes configuring the interactive reports via a library of extensible markup language (XML) configuration files, each XML configuration file being associated with a corresponding one of the interactive reports to map the power data stored in the data store directly to the corresponding interactive report for display on the one or more client devices.

In another embodiment, the invention encompasses a computer-readable storage medium, storing one or more programs configured for execution by one or more processors, the one or more programs comprising instructions to:

communicate with a plurality of remotely located data sources from a performance monitor via a communications network, the plurality of remotely located data sources providing power data including quantitative and qualitative data of one or more power generation units;

extract the power data from the plurality of remotely located data sources;

transform the extracted power data into a common data format;

store the transformed power data in a data store; and display the transformed power data on one or more client devices through the communications network.

Reference will now be made in detail to the embodiments of the present invention, examples of which are illustrated in the accompanying drawings.

The system and method of the present invention is a flexible solution both in terms of the type and amount of data processed and in terms of monitoring and reporting to the above-identified problems of the prior art. In general, the system and method of the present invention is a hosting asset performance monitoring and reporting tool used by owners or power generators, such as independently owned utilities, municipalities, and cooperatives, for example. It is to be understood that other users and benefits may be realized without departing from the scope of the invention. The system and method of the present invention provides, for example, dashboard reporting (e.g., for management-level), summary/drill-down reporting (e.g., back office processing), daily operational reporting (e.g., operations), query interface for plant supervisory control and data acquisition (SCADA) information on ad-hoc basis, and near real-time status and logging capabilities. Accordingly, the system and method of the present invention provides, for example, logged information created by automated plant monitoring systems and/or plant personnel as events occur with relative SCADA and market information. The details of the system and method of the present invention is described below.

FIG. 1 shows a block diagram illustrating an overall system architecture of an exemplary embodiment of the present invention. As shown in FIG. 1, the system of the present invention includes a hosting monitoring center 10 in communication with a plurality of remotely located disparate data sources 20 over a communications network 30. The communications network may be any data communications network, such as point-to-point connections, local area networks (LAN), wide area networks (WAN), Internet, etc. and may be over a wired or wireless communication medium. The remotely located disparate data sources 20 provide qualitative information (e.g., events type data) and quantitative information (e.g., market data) related to a hosted power generating unit. For example, as shown in FIG. 1, the hosting monitoring center 10 may be in communication with a hosted power plant 20a and SCADA data center 20b. SCADA data center 20b may be any data source that archives time-series SCADA or telemetry data of a power generator, also sometimes referred to as SCADA historian, such as megawatts produced, fuel consumption, etc. Generally, SCADA data center 20b collects SCADA information from a plurality of power generations located within a defined region. However, any SCADA data source may be used without departing from the scope of the present invention. The hosted power plant 20a provides internal operations data of the power plant, such as operational event logs, the amount of power being generated, operational cost information (including unit design and budget data), etc. "Budget" data, as used herein, includes financial/cost expectations as well as operational expectations, such as expected hours of operation, expected number of starting the generators over a projected time frame, how much power is expected to be generated, etc. It is to be understood that the data provided by the hosted power plant 20a may overlap with the information provided by the SCADA data center 20b and may be used independently of, or in conjunction with, each other. Other remote data sources may include market and financial information data services (not shown) that provide historic and real-time market information to the monitoring center 10.

The hosting monitoring center 10 includes power data server 12, market data server 14, and web server 16. It is to be understood that these servers may be implemented in a single machine or a plurality of machines without departing from the scope of the invention. The power data server 12 and market data server 14 are configured to obtain data from any number of the disparate data sources 20. The data sources 20 may be databases from hosted or unhosted systems, such as independent system operators (ISOs), regional system operators (RSOs), and SCADA data centers, for example. The data may also be obtained from internal data sources of hosted and unhosted system, such as data from internal databases, spreadsheets, and other software packages. The power data may, in some embodiments, include market-type data such as, for example, power pricing, fuel pricing, or the like. The power data server 12 and market data server 14 convert the collected data into a common format and store the transformed data in data store 18. The data store 18 may be a single or a plurality of data storage devices and may be implemented as a direct data repository or a relational database. Other data store configurations may be used without departing from the scope of the present invention. The web server 16 communicates with client devices 40 to provide monitoring functionality to the users. Client devices 40 may be workstations, notebooks, digital personal assistants, and other data-enabled devices. The web server 16 processes the requests from the client devices 40 and provides the requested information via reports and alarms to be described further below.

In an exemplary embodiment of the present invention, the web server 16 communicates with the client devices 40 via web-based applications. In the exemplary embodiment, the client devices 40 only need a web browser and do not require any specialized applications. The web server 16 includes a proprietary XML-HTTP callback architecture to initiate requests from a browser from the client device 40, for example, back to the web server 16.

Figure 2:
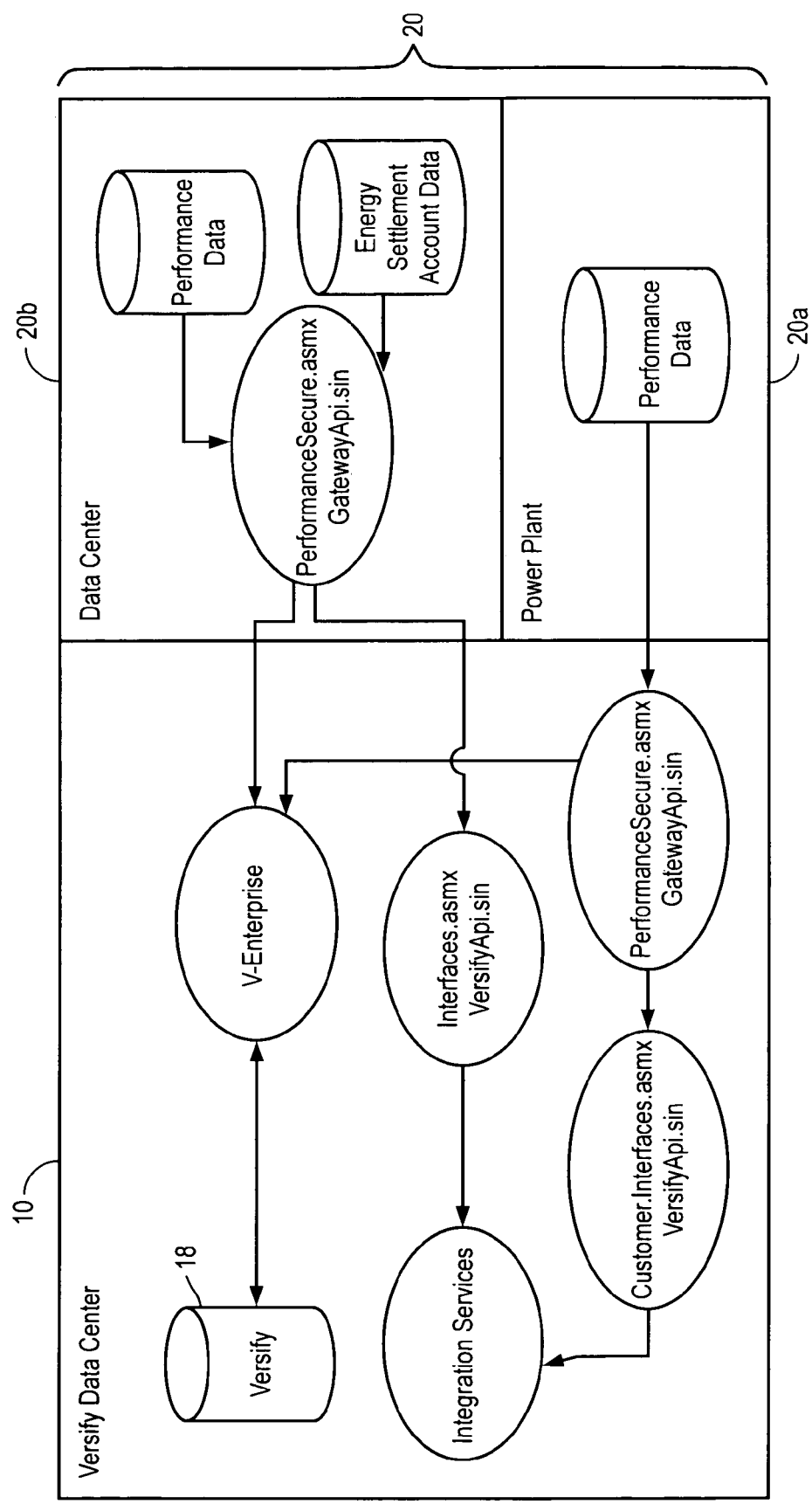
FIG. 2 shows a block diagram illustrating an exemplary embodiment of a communication interface architecture of the present invention.

FIG. 2 shows a block diagram illustrating an exemplary embodiment of a communication interface architecture of the present invention. As shown in FIG. 2, the system and method of the present invention extract data from any number of disparate data sources 20 using a combination of web services and SQL server integration services. For example, the interface architecture in accordance with the exemplary embodiment of the present invention includes hosted Gateway API web service located behind the hosted system's firewalls, Hosting Interface API web service located behind the firewall of the web server 16 that communicates with the hosted Gateway API, and SQL server integration services that communicate with the interface web service, located on the data servers 12 and 14. It is to be understood that locations of the services and additional services may be used without departing from the scope of the invention.

The Gateway API in accordance with the exemplary embodiment of the present invention extracts data from the hosted system's internal applications. The Gateway API accesses known APIs of other commercial software systems and databases as well as any custom code needed to pull data from the hosted system's internal proprietary applications. In an exemplary embodiment, the Gateway API extracts data and returns the data to the web service client as either a ADO DataSet, XML document, byte array, string, or other similar data types.

The Hosting Interface API in accordance with the exemplary embodiment of the present invention provides the ability to communicate with the Gateway API and contains interface logic to transform data into a common data format. The Hosting Interface API, for example, pulls hourly, snapshot, and market data into the data store 18. The Hosting Interface API also generates log events from SCADA information.

The SQL server integration services in accordance with the exemplary embodiment of the present invention drive the communication interfaces. The SQL server integration services utilize mapping data to execute, monitor, and report on scheduled interfaces for each hosted system. In accordance with the exemplary embodiment of the present invention, the SQL server integration services include "retry" logic to ensure that data is not missed due to any sort of system failure.

Once the qualitative and quantitative information of the hosted power generating unit (e.g., power plant 20a) is available, the web server 16 of the hosting monitoring center 10 provides customized reports to the client devices 40 through report interfaces implemented on the web server 16. The report interfaces in accordance with an exemplary embodiment of the present invention are built from a customizable library of report interfaces. The report interfaces of the present invention are customized using extensible markup language (XML)-based "config files" that contain information about what data to extract and how to format the data on a report interface. Accordingly, the XML config files in accordance with the present invention combine data from any number of disparate systems into a comprehensive report. The XML config files of the present invention simply map data from the data store 18 directly to a report interface without requiring any customized code.

Figure 3:
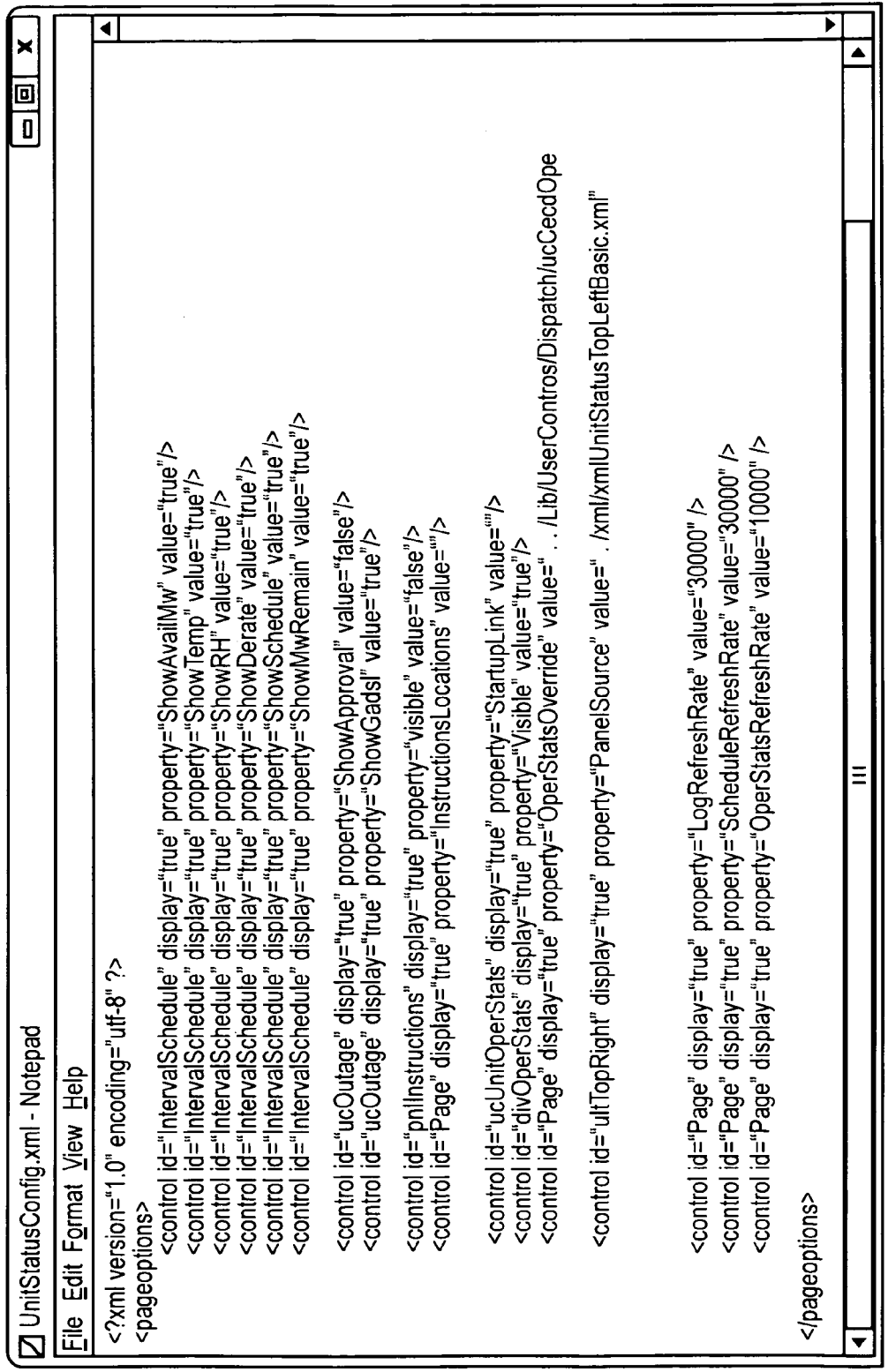
FIG. 3 is an example of a config file in accordance with the present invention.

An exemplary embodiment of the present invention includes page config files and reports config files. The page config file, as shown in FIG. 3, includes XML that may direct the page to change any property of the page itself, or any property of any control on the page. This allows the user interface to be changed without writing any code and increases maintainability across multiple client devices 40. For example, when the page initially loads, the browser automatically looks for a page config file. If a page config file is found, the browser processes the XML for the page contained in the page config file. Each page or control property identified in the XML is then set based on the page config file setting. To illustrate, a button on the page may be hidden by setting the visible property of the button equal to hidden. Furthermore, properties have been created on certain pages such as a unit status report interface, to be explained below, that allow customization of entire sections of the page through the use of custom user controls. In addition, a config file may define standard .NET framework user controls that make-up a page. A particular user control may be overridden for one or more user or customer locations (e.g., power stations or generators) via the config file. In some embodiments, a class (e.g., basePage) invoked because of a load page event may process the config file, change page properties, and override user controls. In the case scenario where a user control is overridden, a new user control may be loaded and a local variable may be set accordingly.

The reports config file defines the layout of a report interface using XML included in the reports config file. The reports config file includes XML fragments for each object to be displayed on the report interface (e.g., graph, pie chart, data table, etc.) The XML fragment includes information specific to the object being shown (e.g., location on report, height, width, colors, etc.) as well as mapping information back to the data store 18 as to what data should be displayed. There may be mappings to multiple stored procedures defined for a single report object. For example, a chart may pull hourly megawatt (MW) data from one stored procedure and hourly price information from another in conjunction with a reporting engine to be described below. In an exemplary embodiment, reports config files may be defined for a single report but have different configurations depending on what hosted system (e.g., power plant) the report is for. For example, each reports config file may have a "default" configuration defined. For any hosted system (e.g., power plant) or unit (e.g., generators) referred to as "locations," where the report is to have a different look and feel and/or different data source, a subsequent "override" XML fragment is defined for the location. Any location that does not have the override fragment reverts to the default layout.

Figure 4:
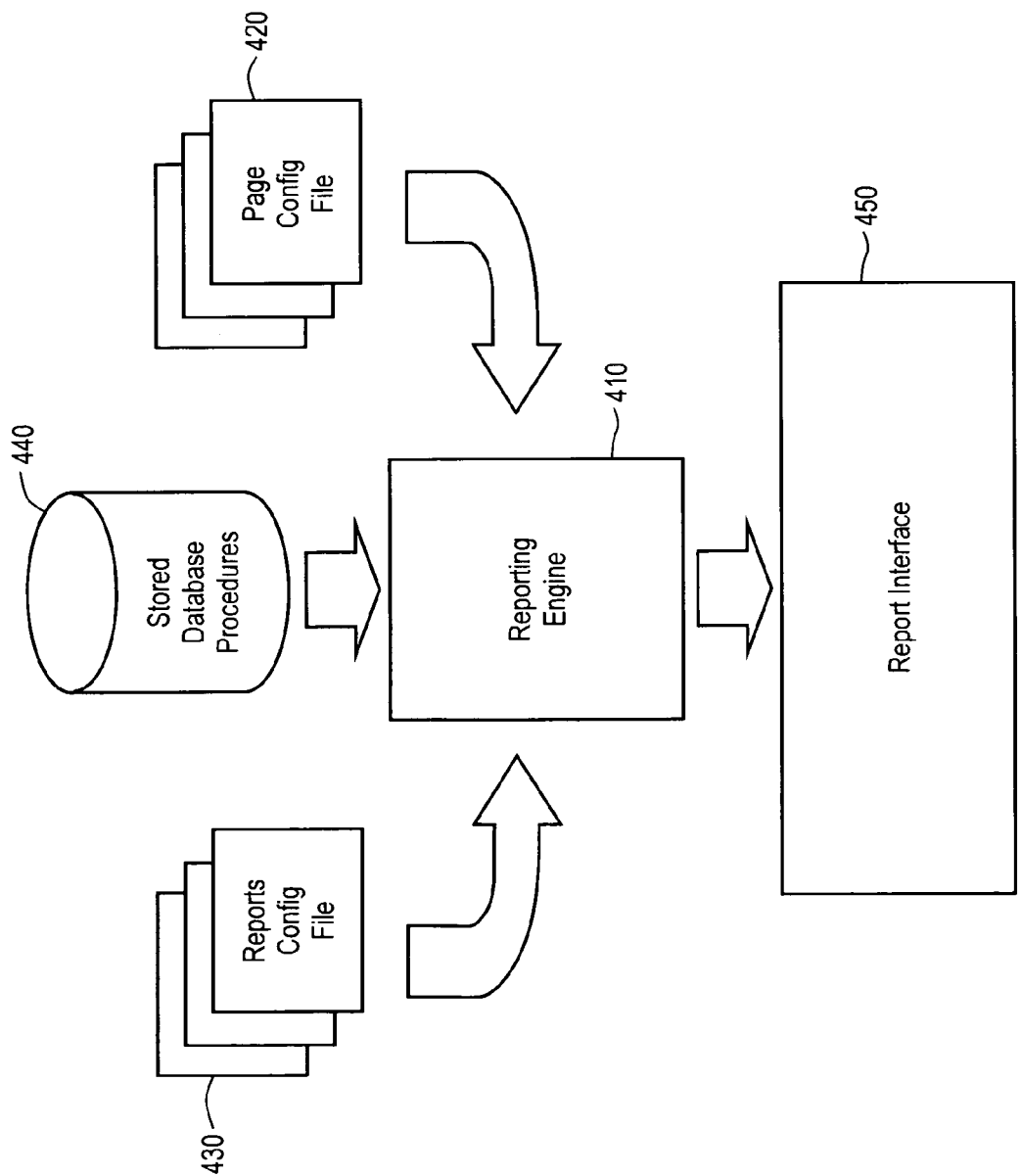
FIG. 4 shows a block diagram illustrating an exemplary embodiment of generating a report interface in accordance with the present invention.
Figure 5A:
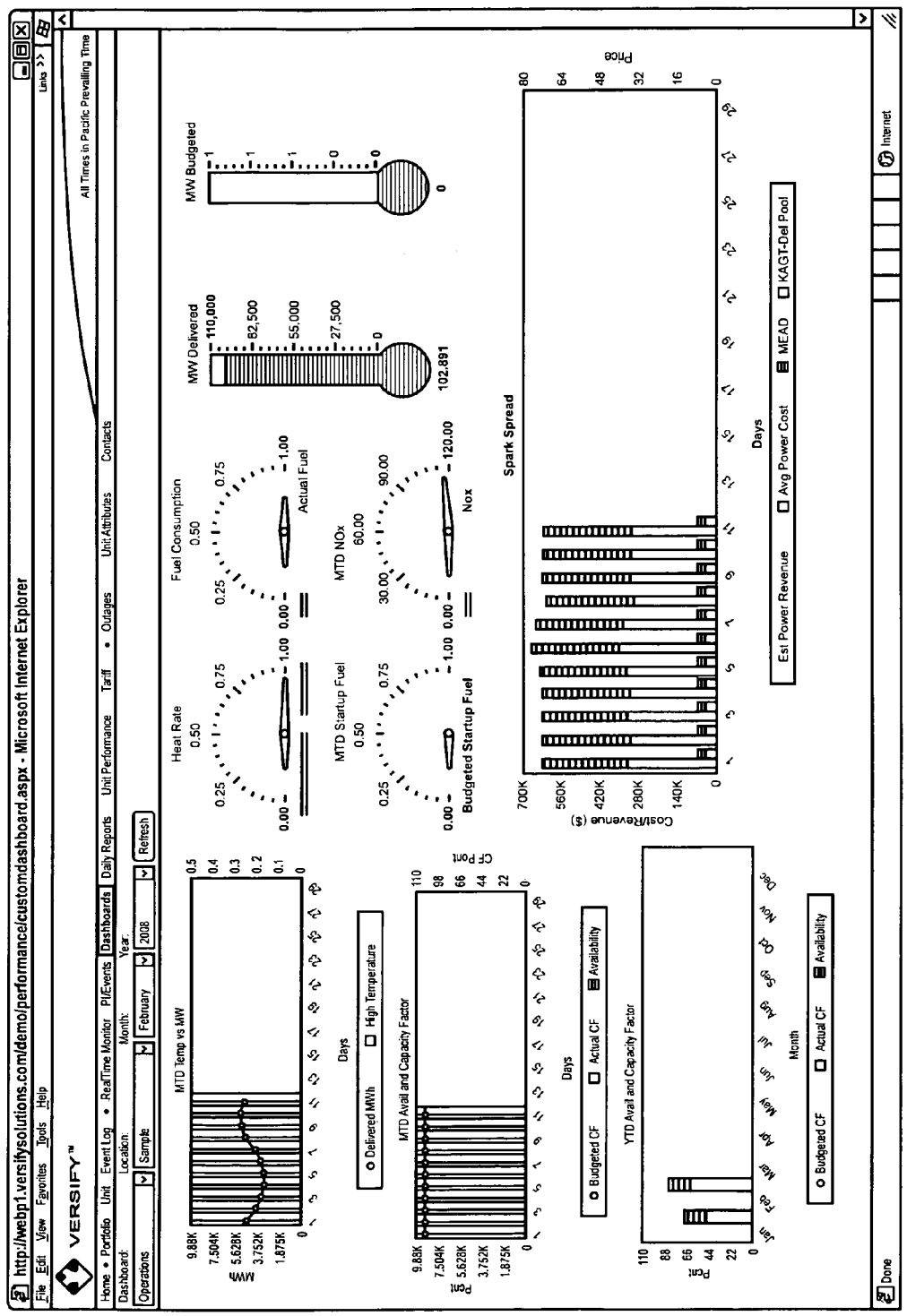
FIGS. 5A-5K show exemplary embodiments of a dashboard report interface in accordance with the present invention.
Figure 5B:
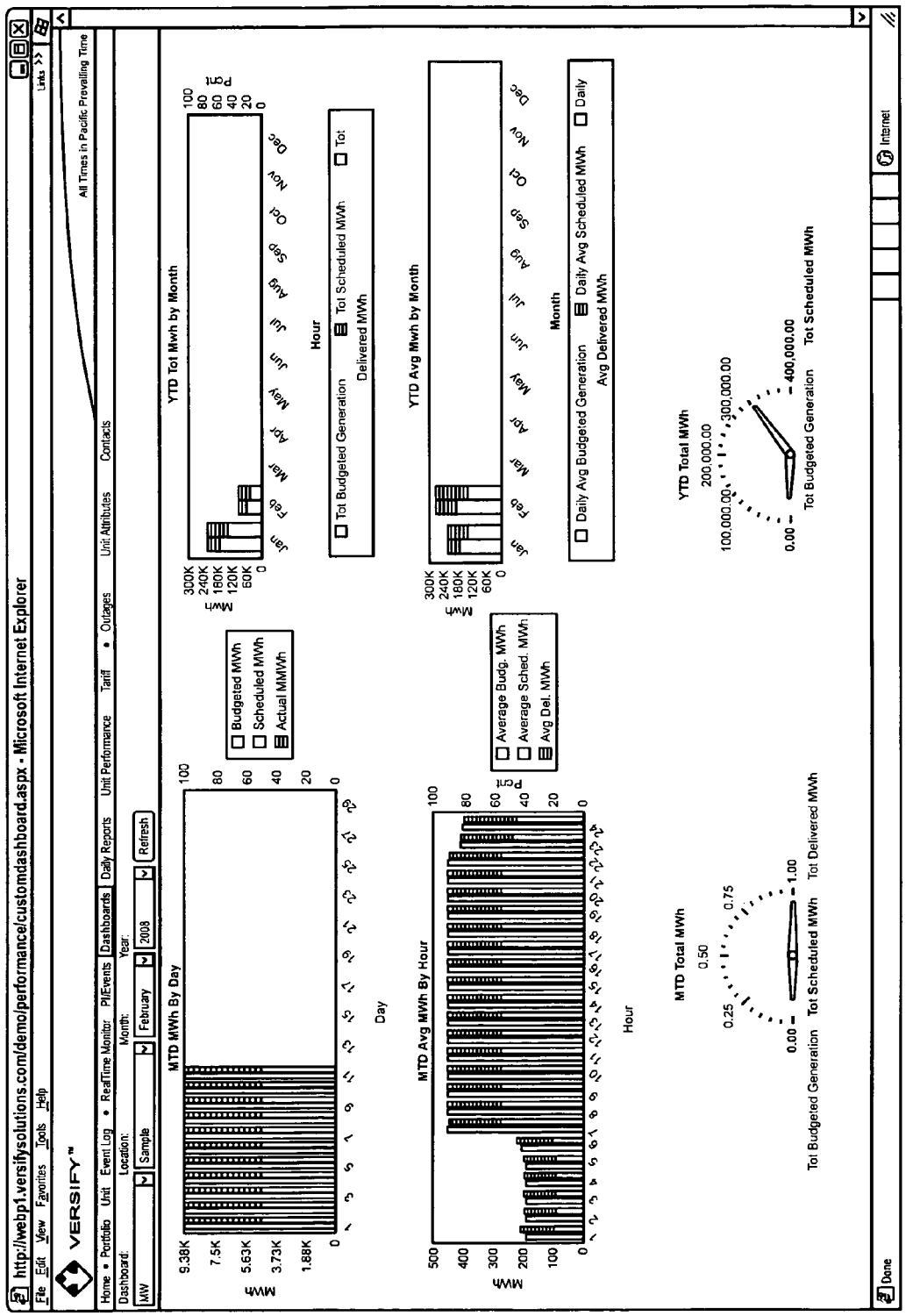
Figure 5C:
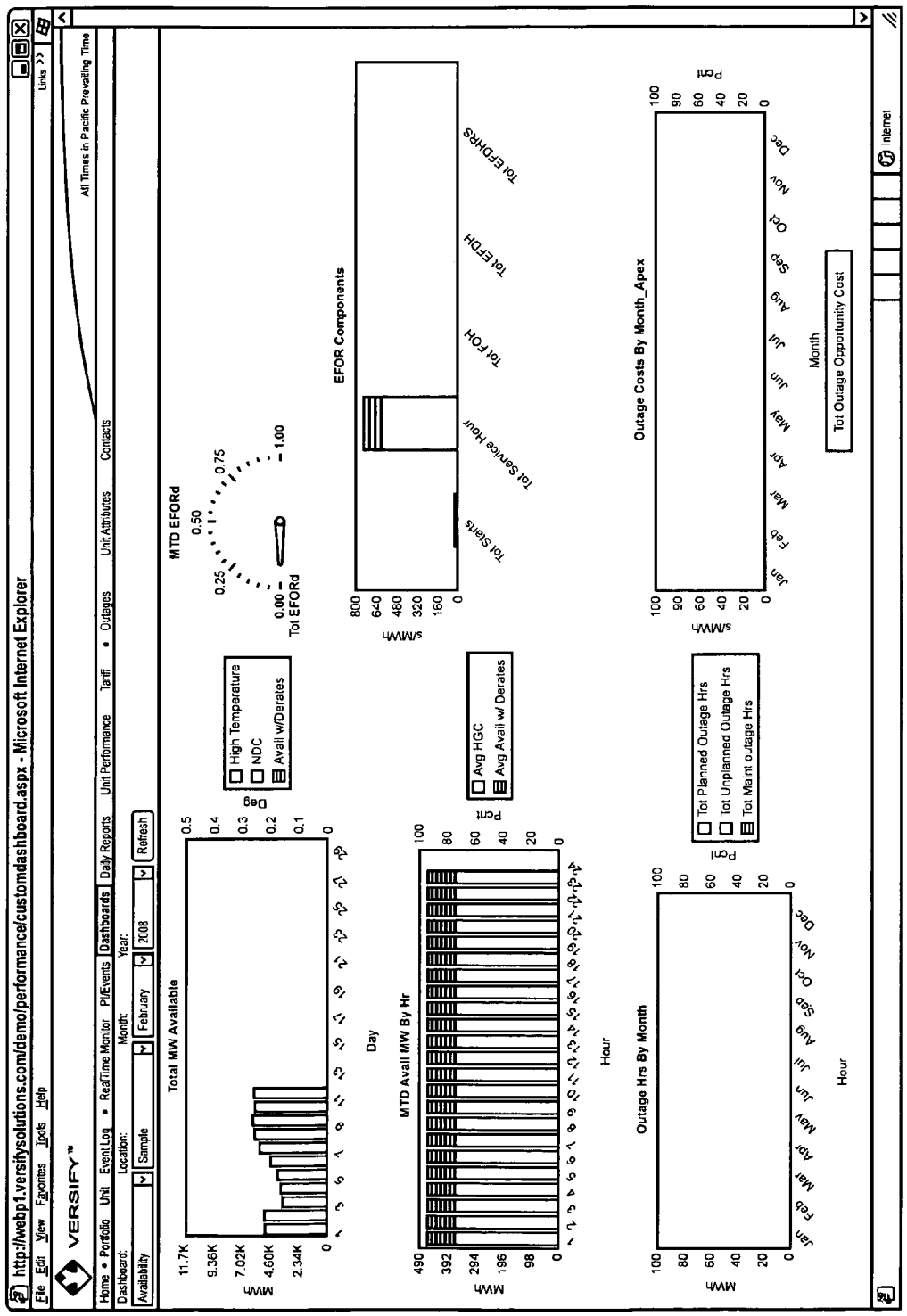
Figure 5D:
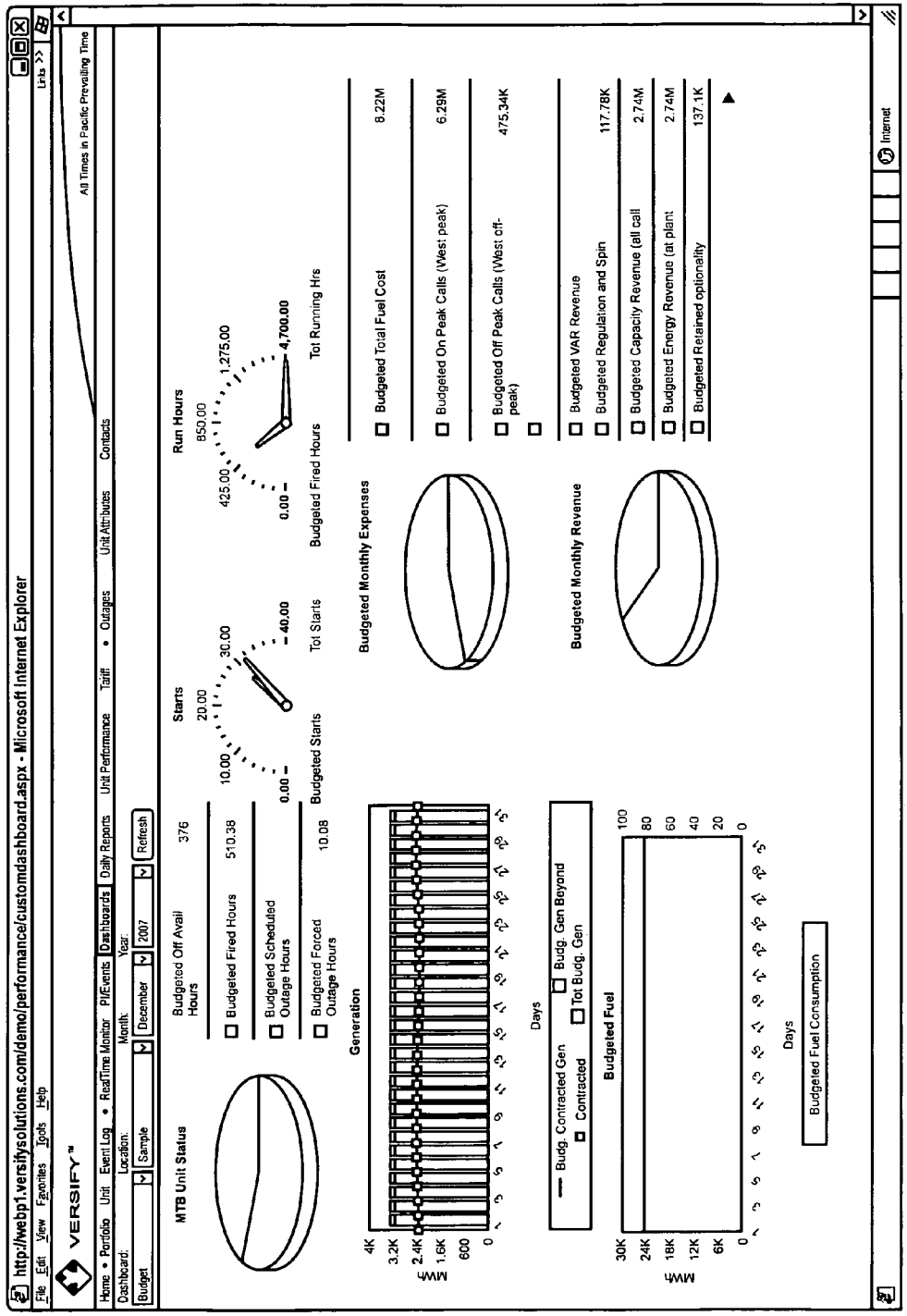
Figure 5E:
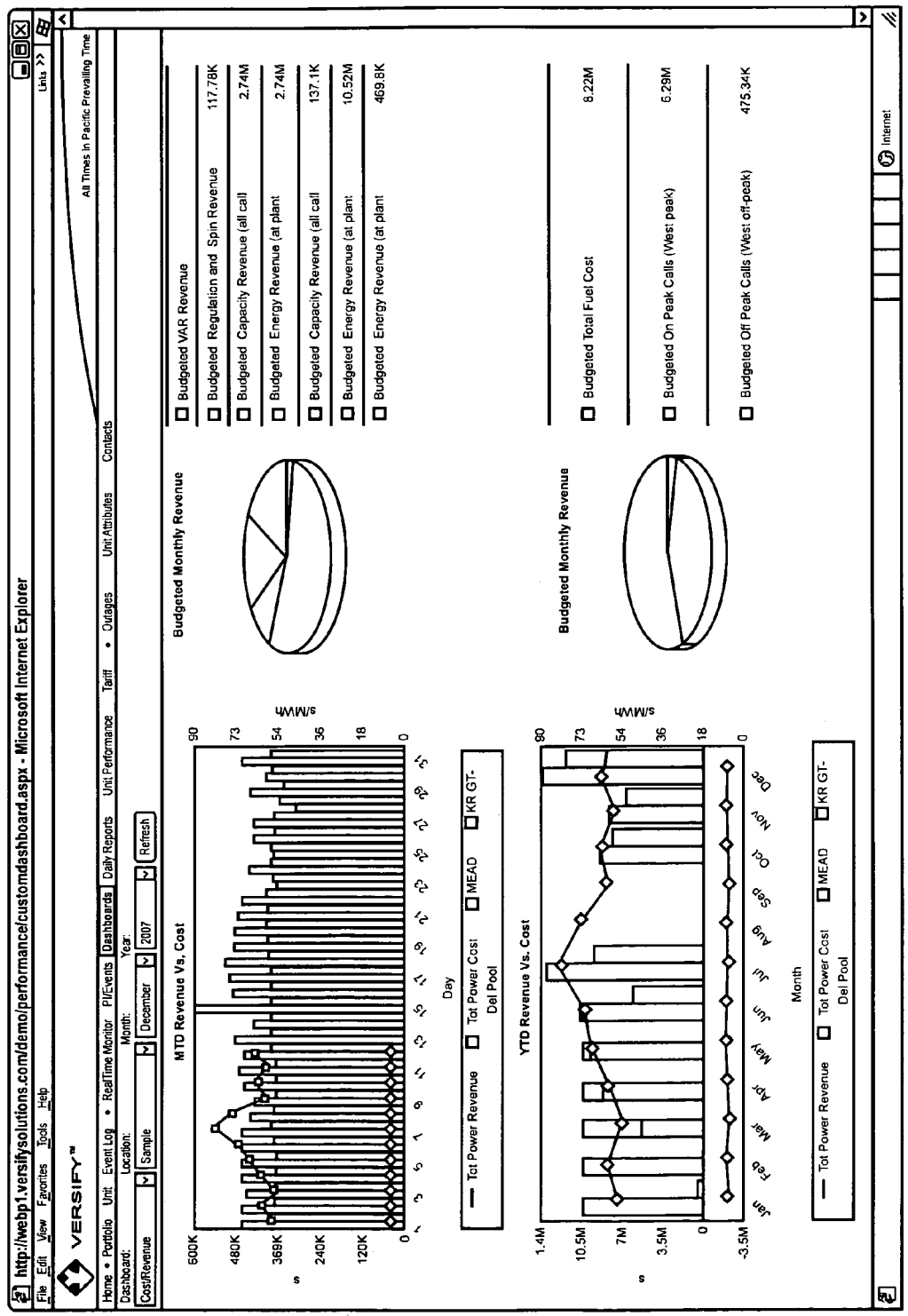
Figure 5F:
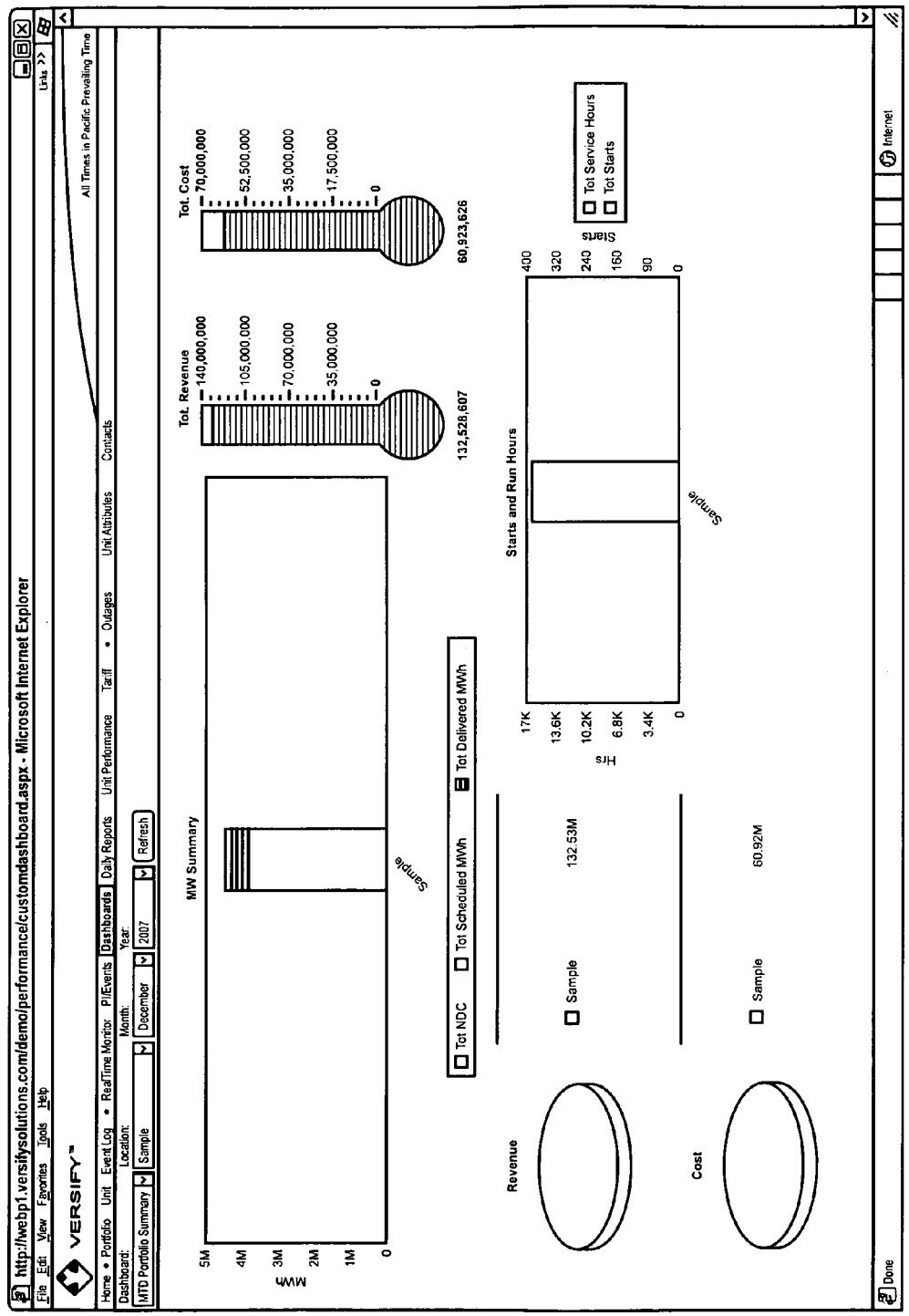
Figure 5G:
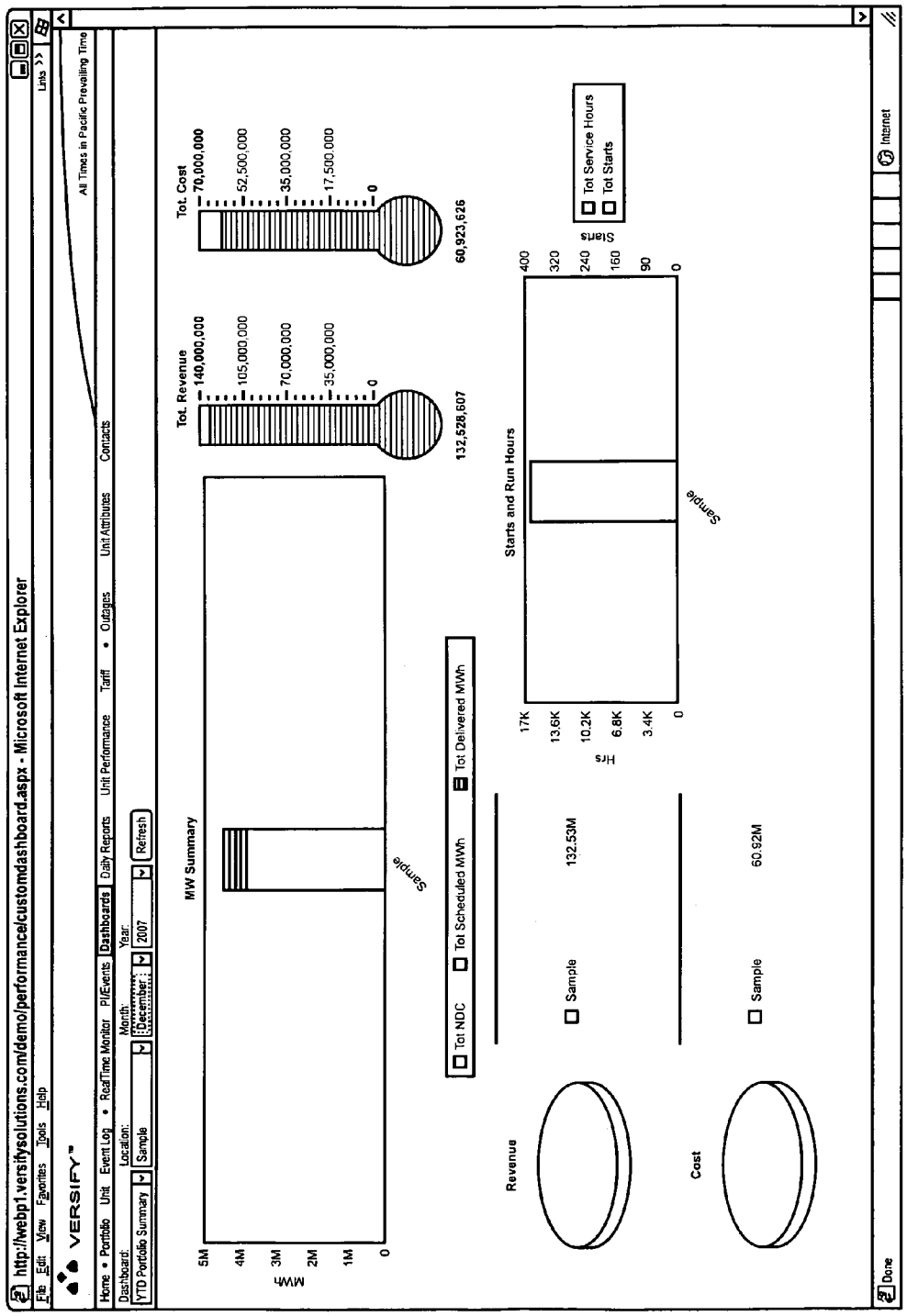
Figure 5H:
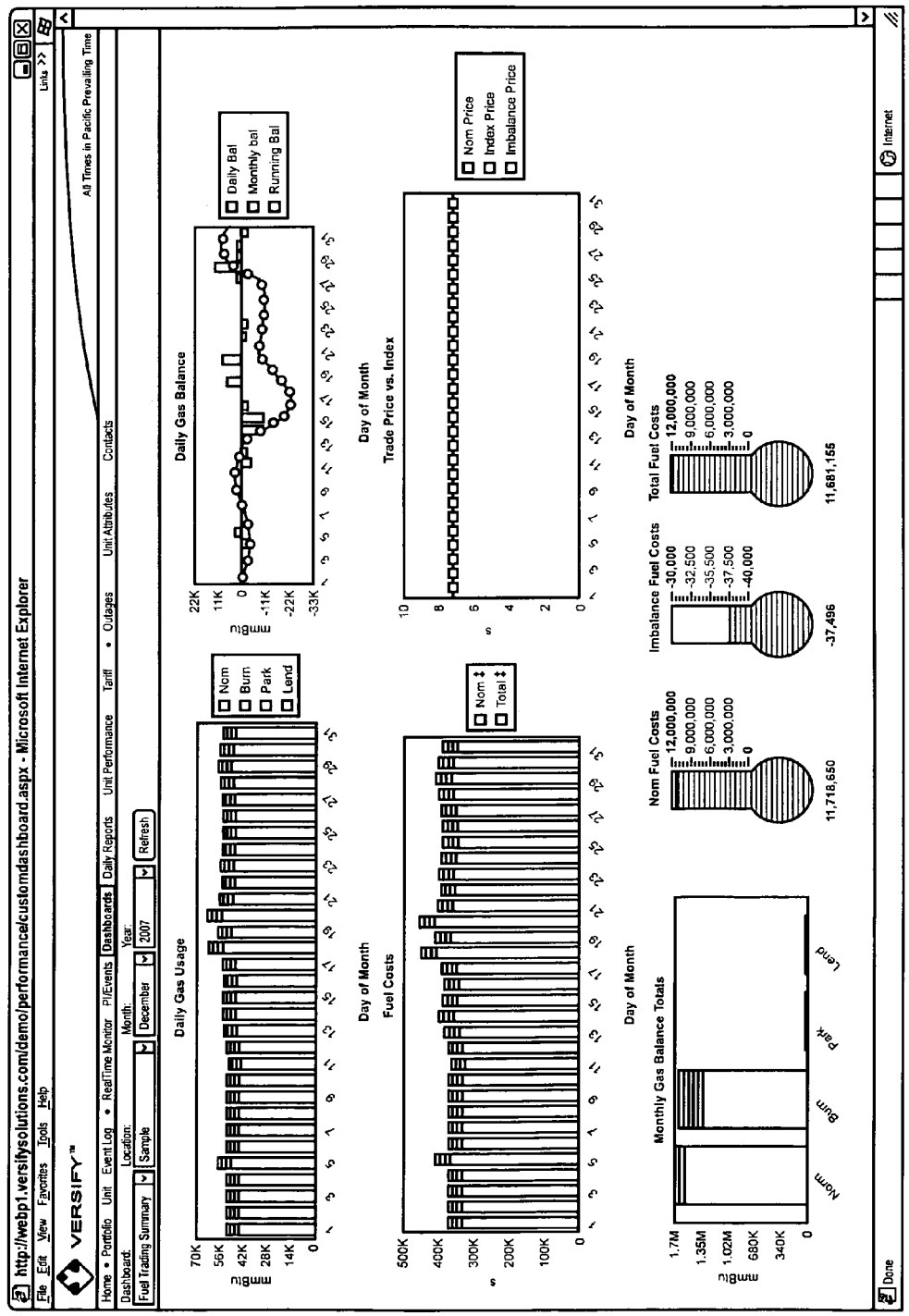
Figure 5I:
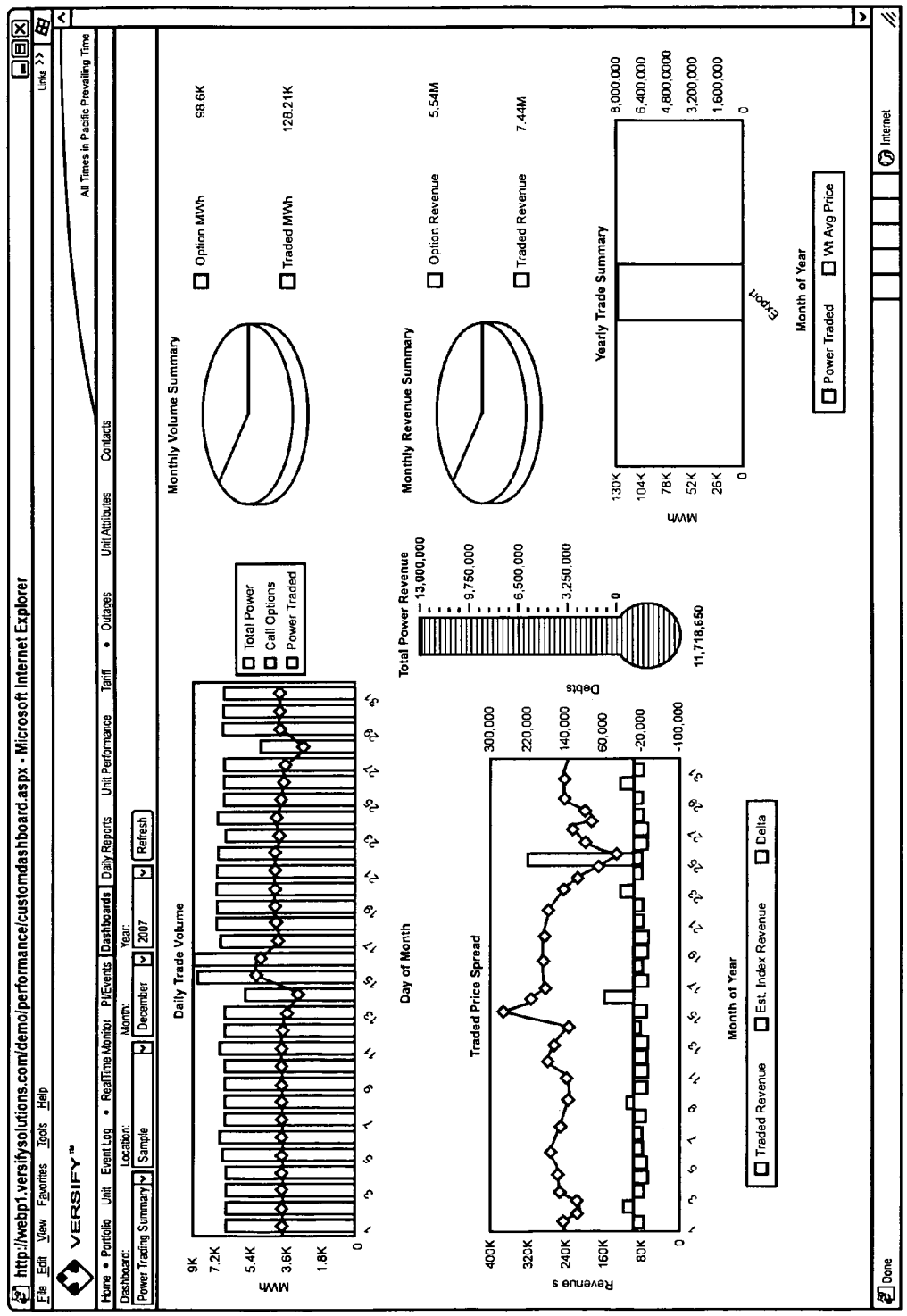
Figure 5J:
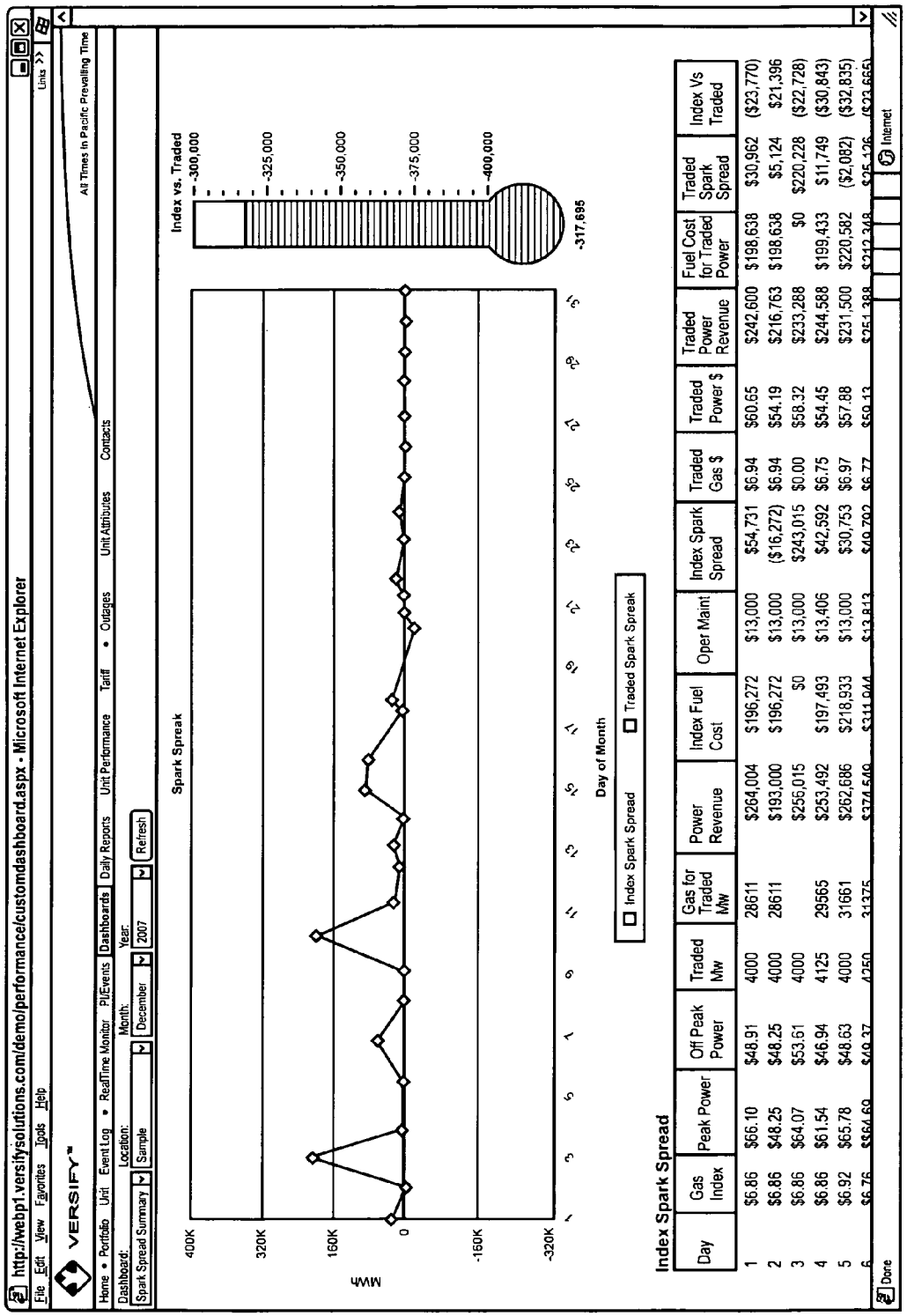
Figure 5K:
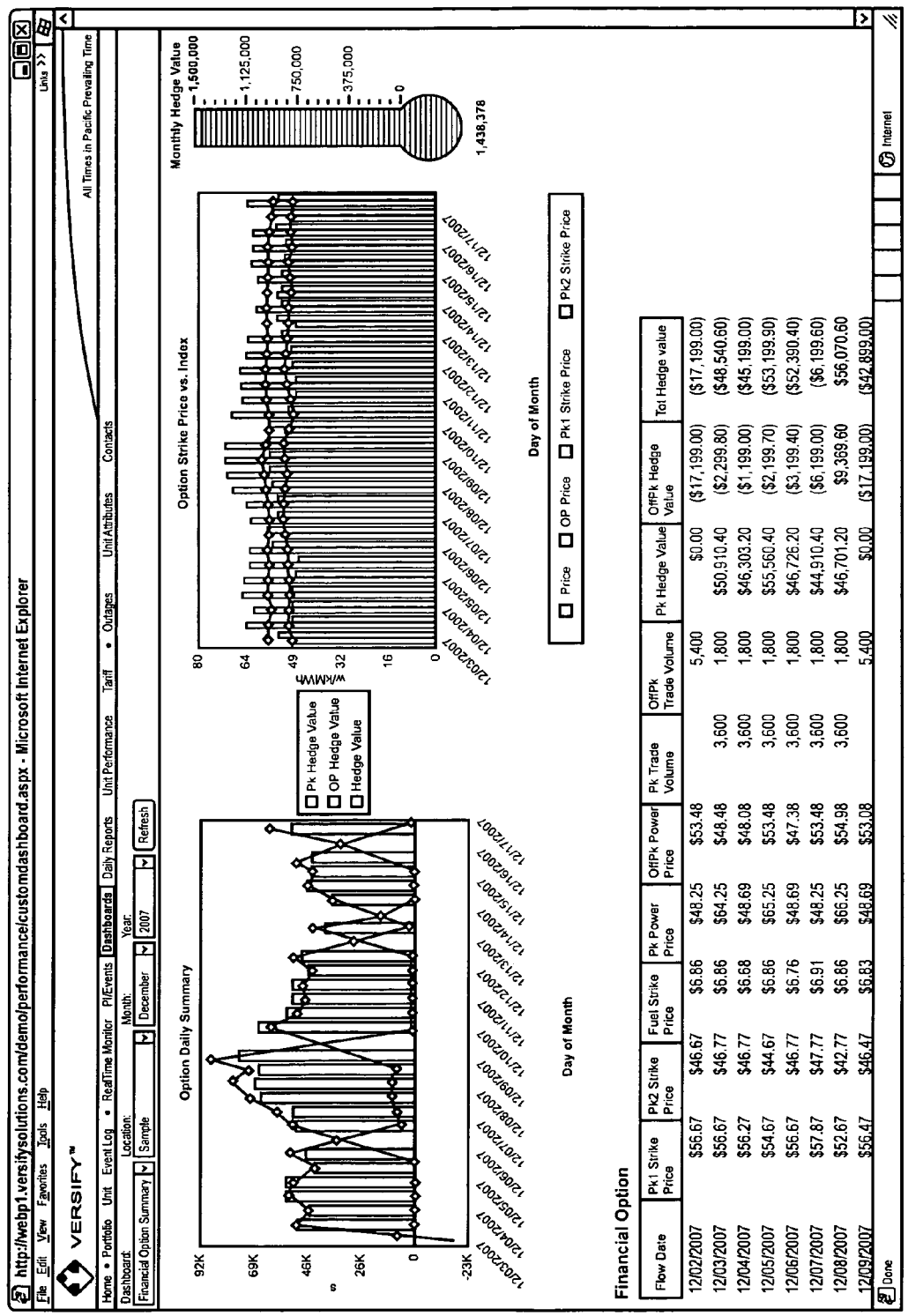

FIG. 4 shows a block diagram illustrating an exemplary embodiment of generating a report interface in accordance with the present invention. A reporting engine 410 processes the page config file 420 and reports config file 430, executes the stored procedures identified 440, and creates and formats the report objects on a report interface 450. The reporting engine 410 returns an HTML div containing the formatted report. The reporting engine 410 loads the reports config file 430 and identifies all of the stored procedures to call using an XPATH query. Once the reporting engine 410 has gathered a list of stored procedures, the reporting engine 410 executes each one, via a data access layer. By executing all stored procedures once and holding them in memory for report processing, extraneous database calls are eliminated to optimize performance. Each result set returned is stored in memory for the remainder of the report processing. The reporting engine then iterates through the report objects to build the actual report interface 450. Object classes are defined for each possible report object (e.g., chart, pie chart, gauge, thermometer, note, table, etc.). The object classes include logic to generate HTML and format data appropriately for each type of report object. For each report object, the reporting engine 410 creates an instance of the class and initializes the object generating basic HTML required. The reporting engine 410 then iterates through each mapped data item to be illustrated in the report object and passes the data item to the class from the appropriate result set extracted from the database earlier. The class processes the data into HTML (or XML) for the report item and finally returns the completely formatted HTML, which is then inserted into the HTML div tags.

In an exemplary embodiment of the present invention, the report interface 450 is categorized as one of the following: dashboard report interface, daily operational report interface, quantitative summary/drill-down report interface (also referred to as "unit performance" interface), an ad-hoc SCADA query interface, and unit status communication interface.

FIGS. 5A-5K show exemplary embodiments of the dashboard report interface. The dashboards page allows users to select any configured dashboard for any power plant within the data store 18. FIGS. 5A-5K show exemplary embodiments of the following dashboards, respectively: Operations, Megawatts (MW), Availability, Budget, Cost/Revenue, MTD Portfolio Summary, YTD Portfolio Summary, Fuel Trading Summary, Power Trading Summary, Spark Spread Summary, and Financial Option Summary. It is understood that other dashboard interfaces may be included without departing from the scope of the present invention. In the exemplary embodiment, each dashboard is run for a selected month. However, other time ranges may be used without departing from the scope of the invention. For example, the user may select a power plant (i.e., location) and a month out of a year, and refresh the report. An XML-HTTP callback is made from the browser on the client device 40 to the web server 16. The web server 16 receives the XML-HTTP request and creates an instance of the reporting engine 410 described above. The reporting engine 410 builds the report interface 450 as described above, which may be an HTML div with report objects in it. The div is returned to the browser on the client device 40 that initiated the XML-HTTP call. The client device 40 refreshes the page on the screen with the newly created report. As shown in FIGS. 5A-5K, the dashboard interface includes a combination of report objects, such as gauges, bar graphs, line graphs, pie charts, and tables to provide an overall performance view of the selected location by integrating the qualitative and quantitative data obtained from the disparate data sources 20, converted into a common format, and stored in the data store 18. The report object may be animated as the information is provided to show movement of the various gauges, bar graphs, line graphs, pie charts, and other graphical representations.

Figure 6B:
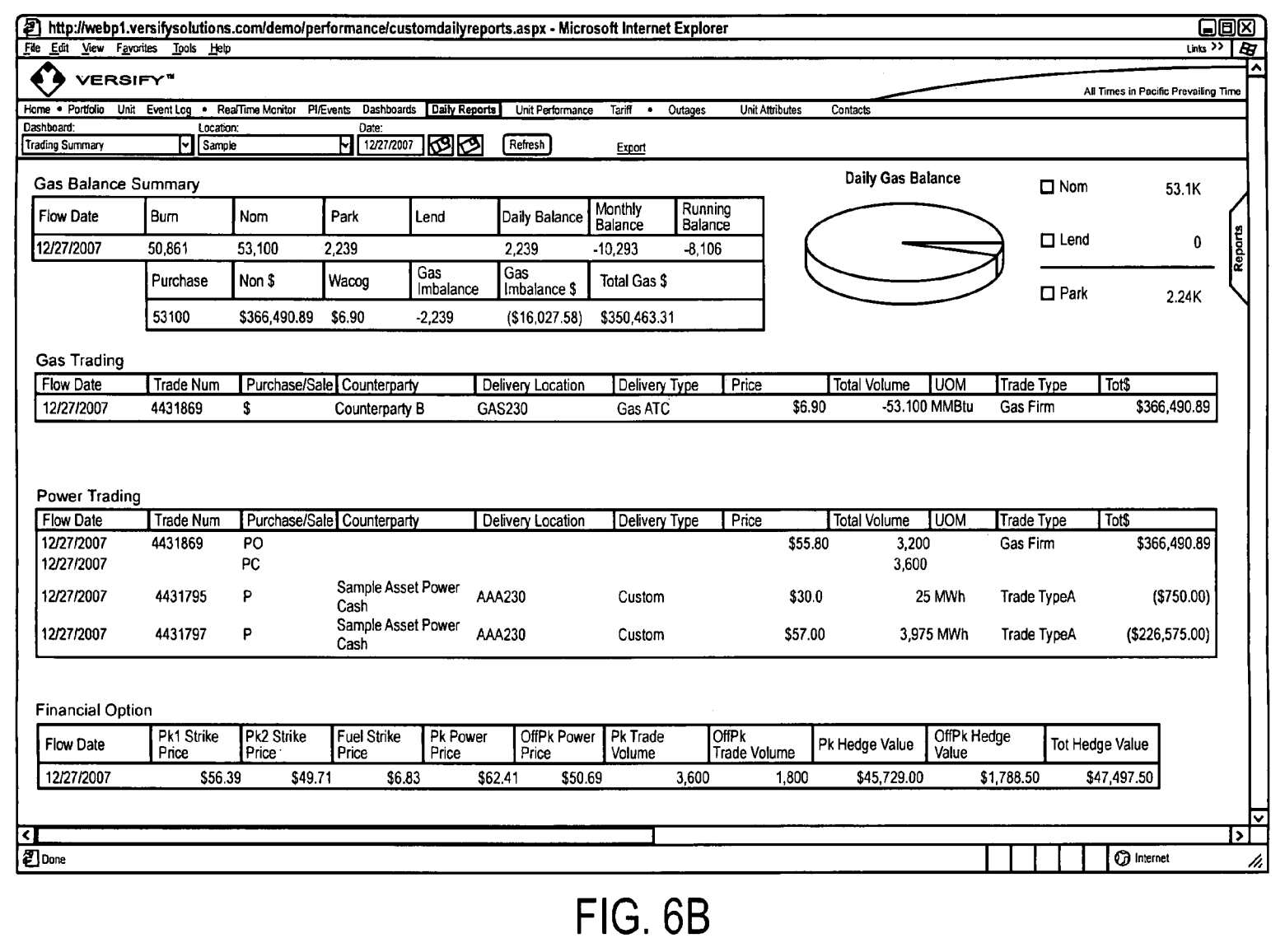

FIGS. 6A and 6B show exemplary embodiments of the daily report interface. The daily reports page allows a user to select a configured daily report. FIGS. 6A and 6B show the Daily Summary and Trading Summary, respectively. Other daily reports may include Day Forecasted Availability and Daily Log. It is to be understood that other daily summary reports may be included without departing from the scope of the invention. For example, the user selects a power plant (i.e., location), a reporting day, and refreshes report. An XML-HTTP callback is made from the browser of the client device 40 to the web server 16. The web server 16 receives the XML-HTTP Request and creates an instance of the reporting engine 410 described above. The reporting engine 410 builds the report as described above, which may be an HTML div with report objects in it. The div is returned to the browser on the client device 40 that initiated the XML-HTTP call. The client device 40 refreshes the page on the screen with the newly created report. The daily report interface provides a summary of daily operational and financial activities of the selected location by integrating the qualitative and quantitative data obtained from the disparate data sources 20, converted into a common format, and stored in the data store 18.

Figure 7A:
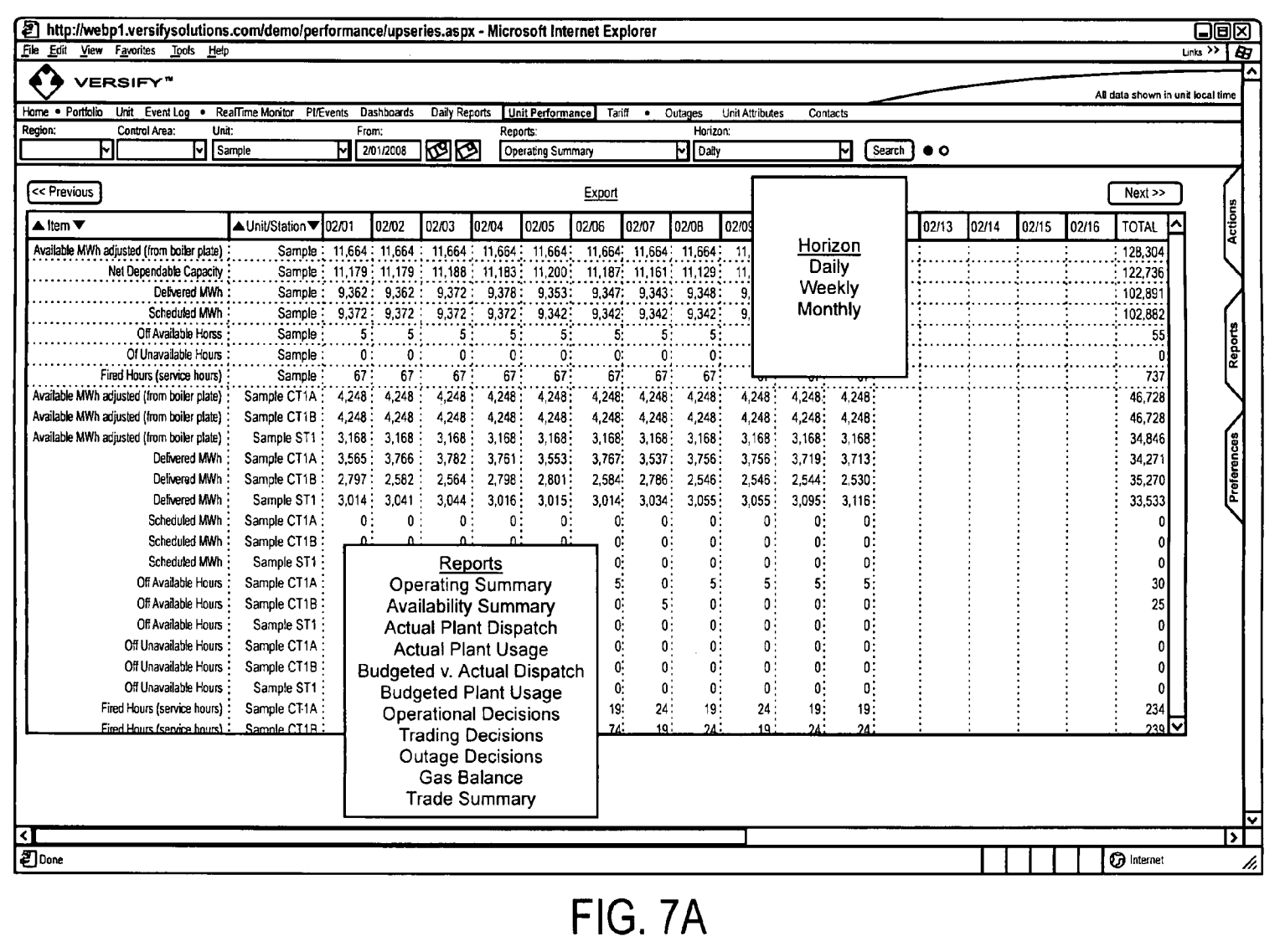
Figure 7B:
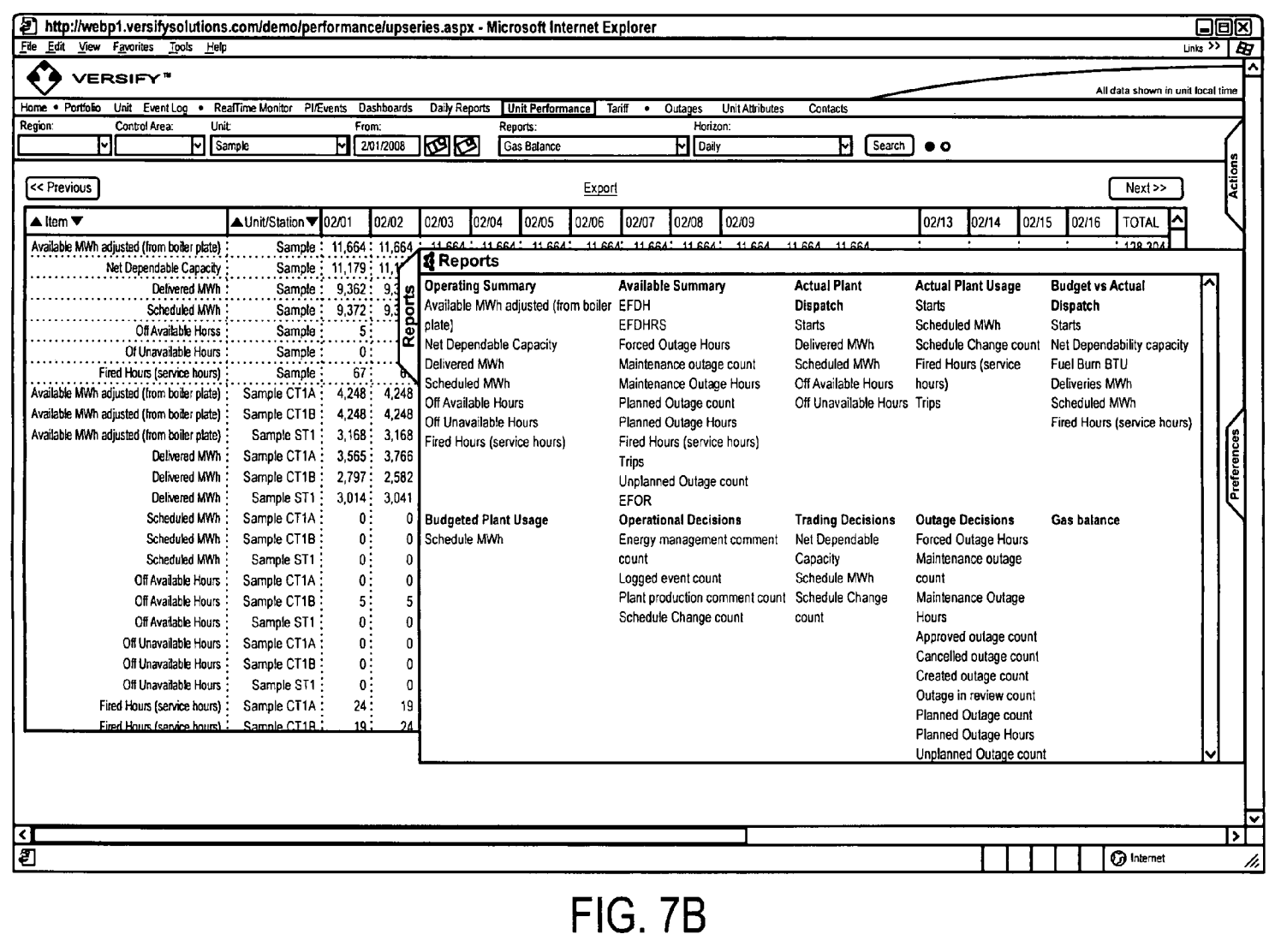

FIGS. 7A and 7B show exemplary embodiments of the unit performance report interface. The unit performance report interface includes quantitative reports for daily, weekly, and monthly time horizon, for example. In addition, the unit performance report interface includes drill down capability so that hourly detail report data may also be retrieved. In the exemplary embodiment, the unit performance report interface includes the following reports: Operating Summary, Availability Summary, Actual Plant Dispatch, Actual Plant Usage, Budgeted v. Actual Dispatch, Budgeted Plant Usage, Operational Decisions, Trading Decisions, Outage Decisions, Gas Balance, and Trade Summary. It is understood that other summaries may be included without departing from the scope of the invention. In the exemplary embodiment, the unit performance report interface and the items displayed are maintained in an XML fragment in the unit performance page's reports config file 430. For example, a user selects a report, a time frame, and a time horizon to initiate the report. The browser of the client device 40 initiates a callback to the web server 16, which in turn calls a stored procedure 440. The stored procedure includes logic to summarize the data to the selected level (daily, weekly, monthly). When the result set is returned to the web server 16, the page is correctly formatted with the data into a table with the correct number of columns (e.g., based on daily, weekly, or monthly) and returns the table to the browser on the client device 40. As shown in FIG. 7B, the unit performance page also includes drill down capability to drill down into a liner granularity (e.g., hourly details). Database mapping tables are used to map summary items on the main page to the hourly detail. When a user clicks on a cell on the main report, the browser on the client device 40 initiates a callback. The callback request is received by the web server 16, and a stored procedure 440 is executed to retrieve mapped detail from the data store 18. The mapped detail is returned to the client device 40 as a table, for example.

Figure 8:
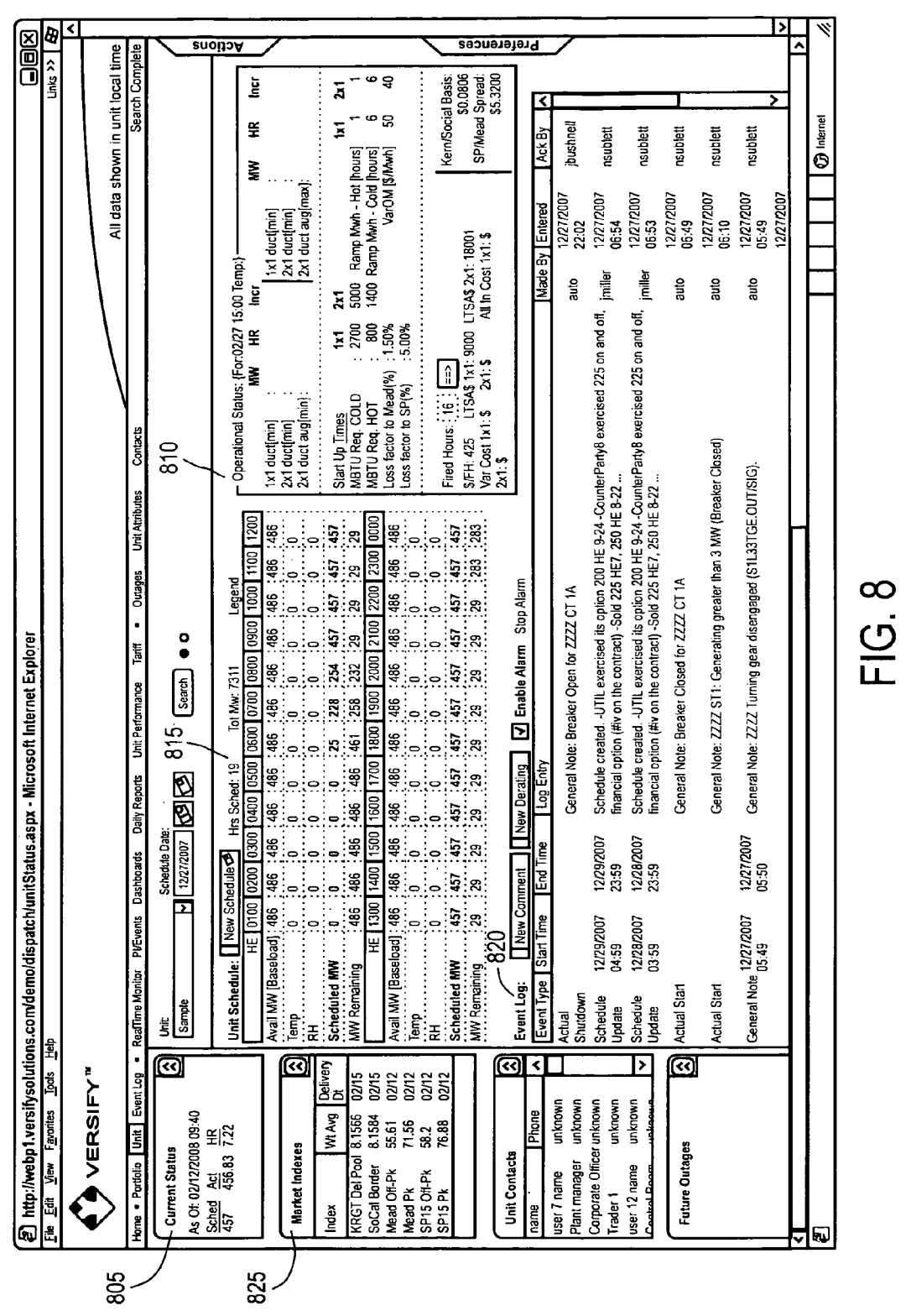

FIGS. 8-11B show exemplary embodiments of ad-hoc SCADA query interface and unit status communication interface in accordance with the present invention. For example, FIG. 8 illustrates an exemplary unit interface that displays operational information of a selected unit. The information may include current status 805, operational statistics 810, schedules 815, event logs for the unit 820, and market data 825. The information may be displayed for a selected date. It is to be understood that other information regarding the selected unit may be included without departing from the scope of the invention.

Figure 9:
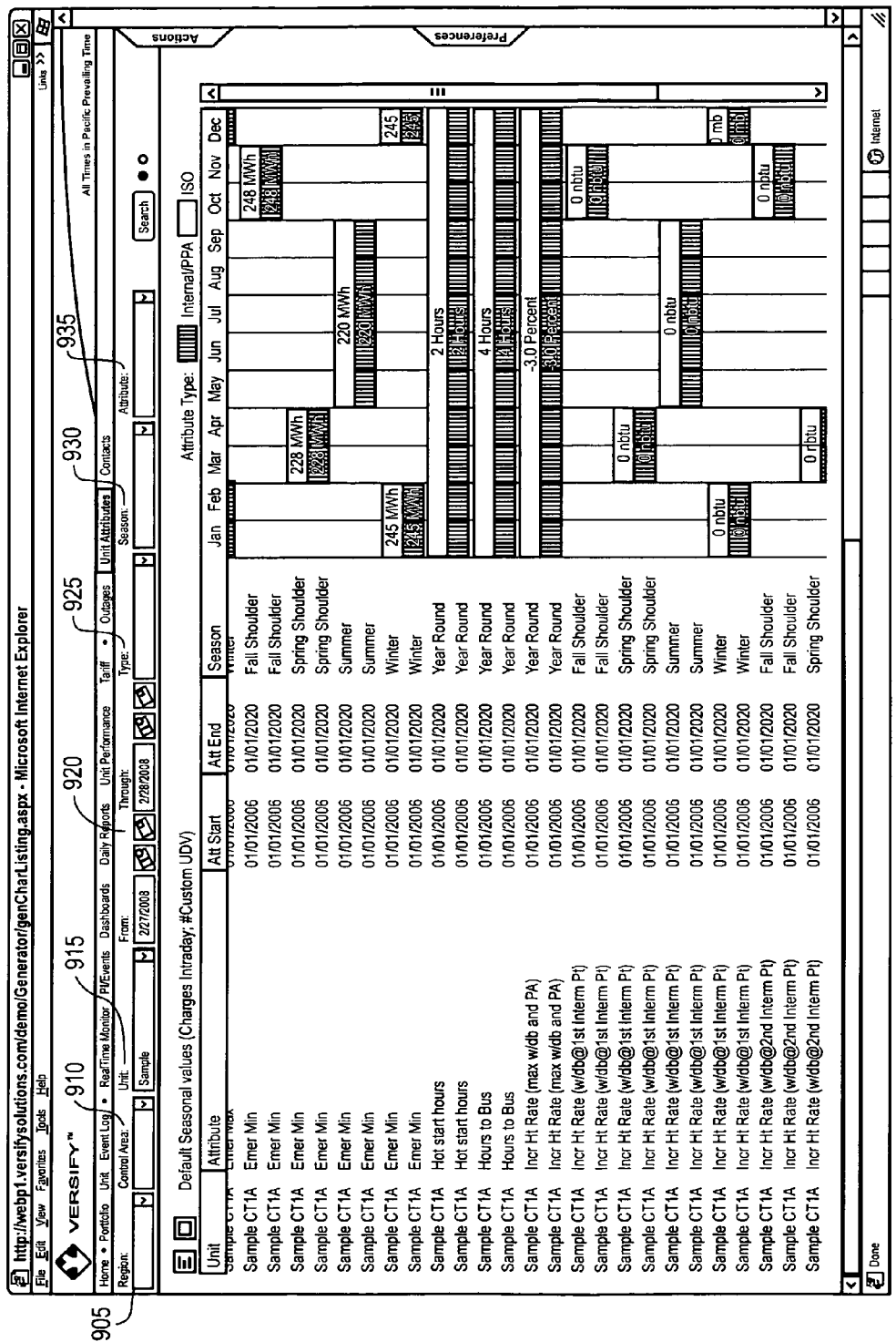
FIG. 9 illustrates an exemplary unit attribute interface in accordance with the present invention.

FIG. 9 illustrates an exemplary unit attribute interface that displays a summary of the operational attributes based on region 905, control area 910, unit 915, and date range 920, for example. Other criteria, such as type 925, season 930, and attribute 935 may be selected for viewing.

Figure 10:
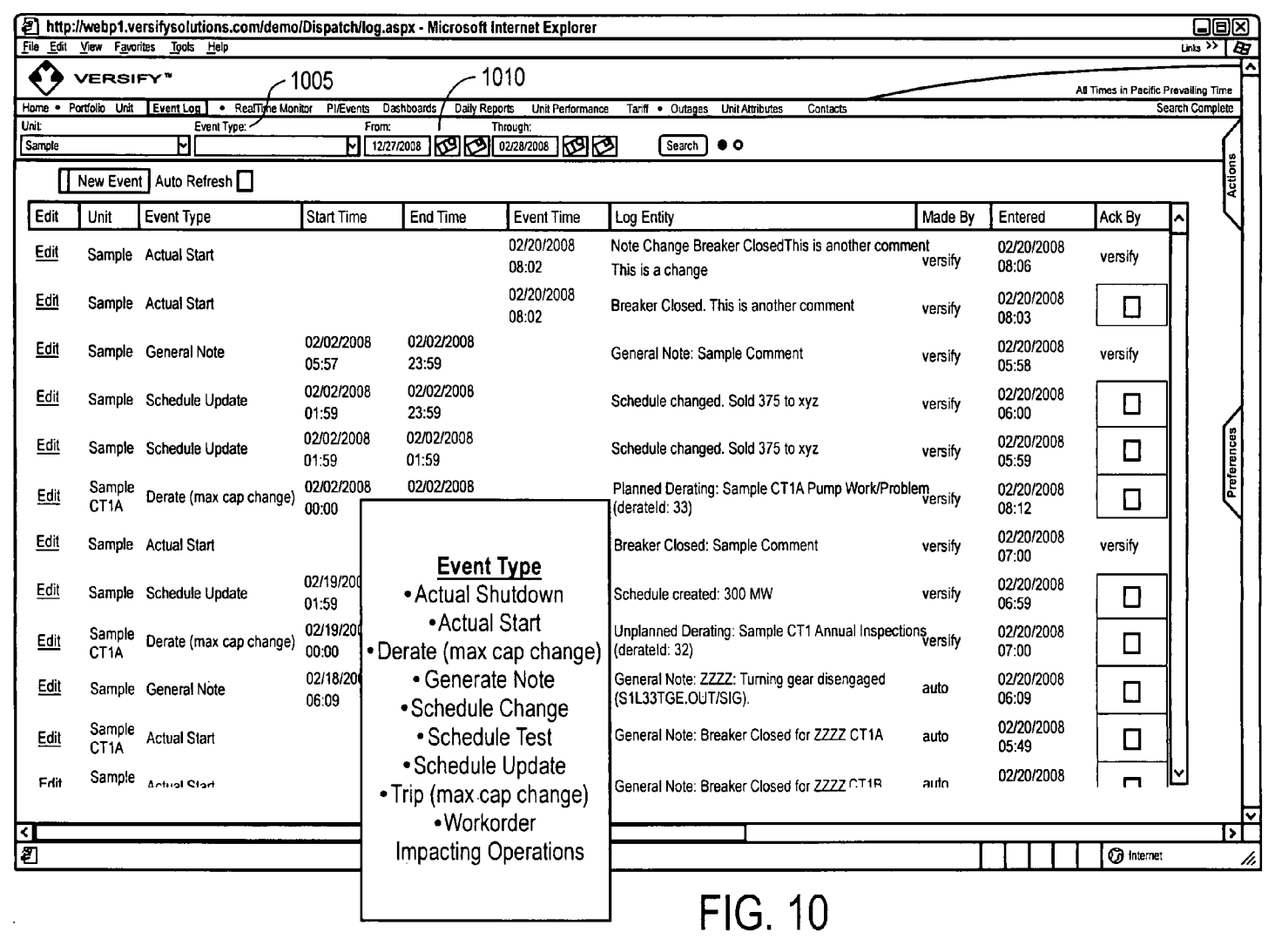

FIG. 10 illustrates an exemplary event log interface for a selected unit. The event log may be sorted based on event type 1005 and date range 1010, for example. In an exemplary embodiment, the event types may include, but not limited to: Actual Shutdown, Actual Start, Derate (max cap change), General Note, Schedule Change, Schedule Test, Schedule Update, Trip (max cap change), and Workorder Impacting Operations.

Figure 11B:
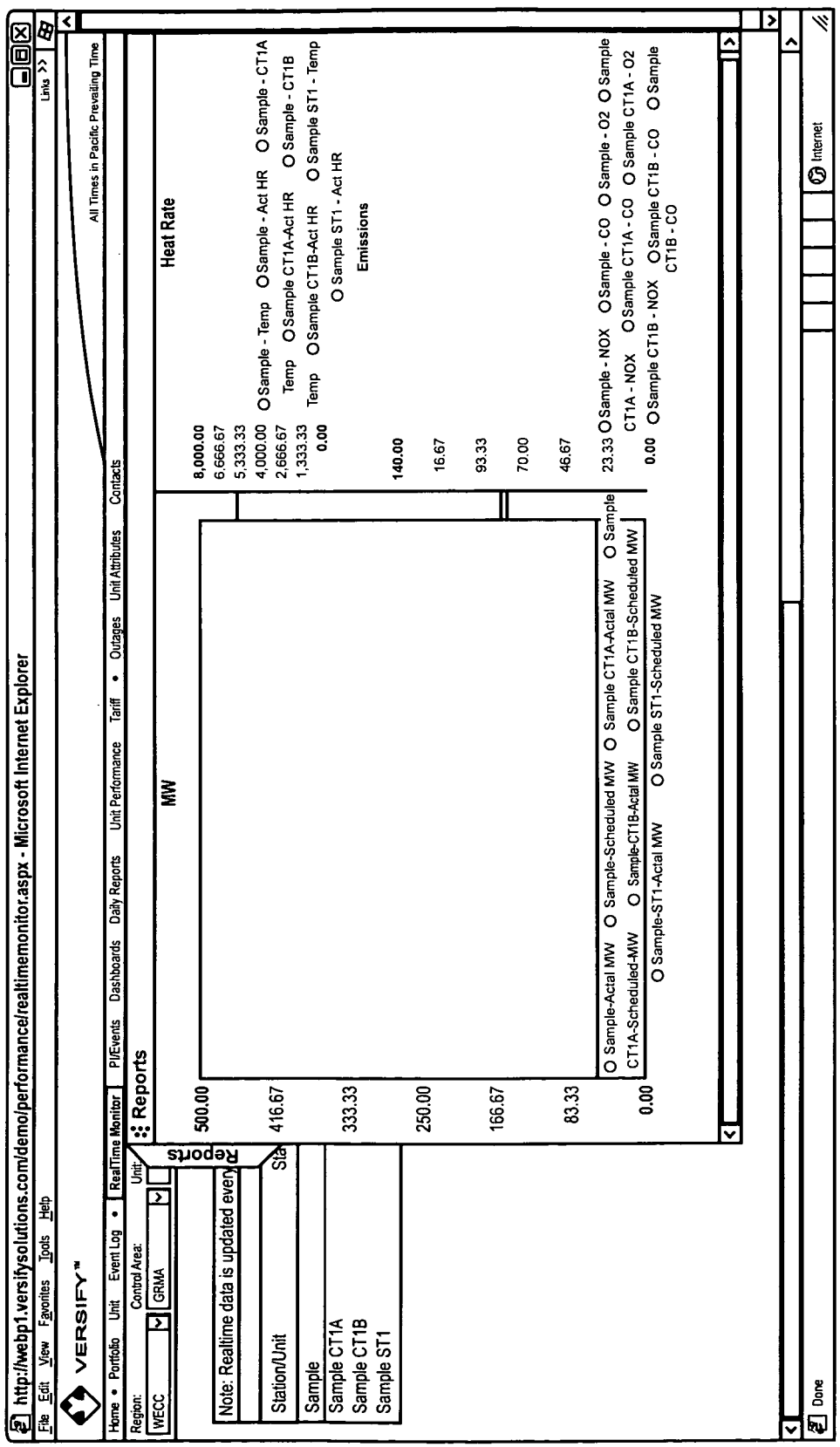

FIGS. 11A and 11B illustrate an exemplary (near) real time monitor for a selected unit. In an exemplary embodiment, the operational data of a hosted power plant is updated every three (3) minutes. However, the period for update may be changed without departing from the scope of the present invention. The monitor may be selected based on region, control area, unit, and technology. Technology criteria may include, but is not limited to, BWR, CCGT Gas, CCGT Steam, Diesel, Fluidized Bed, Combustion, Fossil Steam, Gas Turbine, Geothermal, Hydro, Jet, Pumped Storage, PWR, and Wind Turbine. As shown in FIG. 11B, the real time monitor includes a pull-out to provide graphical representation of the monitored parameters, such as megawatt (MW), heat rate, and emissions. Other parameters may be included without departing from the scope of the present invention.

In addition to the real time monitoring, the system and method of the present invention includes alarm monitoring and tracking of user-defined significant events. For example, the monitoring center 10 of the present invention tracks and logs when a hosted unit comes on-line or goes off-line. The monitoring center 10 tracks alarms against any generation operational parameter that is archived in the time-series data store 18. This is implemented by querying the time-series historical data store 18 for values archived for a selected operational parameter over a set time interval. For example, for a generator unit on-line alarm, the monitoring center 10 queries the historical archive in the data store 18 for a fifteen (15) minute interval and examines breaker status recorded during that timeframe. Any change in the monitored value represents an event, which triggers an alarm. Once examination for the given parameter and time period is complete, the monitored time interval is marked as examined and the alarm as tracked. Future monitoring of the historical archived data in the data store 18 will check subsequent intervals based on what has already been marked as examined.

The alarming feature is not limited to tracking on/off types or digital state data. Rather, monitored recorded events may also be examined based on numerical thresholds. For example, generation managers may wish to monitor megawatt (MW) levels and create different events based on the number of megawatts produced at a power generation facility. The plant may want to be alerted when the megawatt (MW) level reaches a specific level, such as 100, 250, and 500. Each MW level reached requires a unique action or log entry to be recorded. Such alarms are defined in the monitoring center 10 to initiate tracking and logging. For example, in an exemplary embodiment of the present invention, alarms may be defined by noting the following data points:

Archive historian database;
Archive historian data point to monitor;
Compare value (or alarm value);
Alarm log message to create when value is greater than comparison value;
Alarm log message to create when value is less than comparison value; and
Alarm log message to create when value is equal than comparison value.

To ensure all intervals are examined, examined archived data may be marked by noting:

Archive historian point examined;
Alarm that is tracked;
Examination start time; and
Examination end time.

This serves to baseline subsequent interval checks. It is to be understood that other notations may be made without departing from the scope of the present invention.

In accordance with an exemplary embodiment of the system and method of the present invention, monitoring of any number of hosted power generation units is realized by collecting qualitative (e.g., event data) and quantitative (e.g., cost, market data) information from a plurality of disparate data sources, converting the disparate data into a common data format, and storing the transformed data to be served up through a communications network, such as the Internet, to a plurality of client devices that may be located anywhere in the world. The various report interfaces in accordance with the present invention allow the user to monitor the performance of the hosted power generation units including a comparison of the actual performance of the monitored unit with expected (i.e., budgeted) performance. The system and method of the present invention generates reports using XML config files to reduce the time to build and customize any number of reports. The XML config files allow developers to simply map data from database stored procedures directly to a report without writing any code to reduce the time required to deliver a report and eliminate the need for any code changes to existing applications.

It will be apparent to those skilled in the art that various modifications and variations can be made in the system and method of the present invention without departing from the spirit or scope of the invention. Thus, it is intended that the present invention cover the modifications and variations of this invention provided they come within the scope of the appended claims and their equivalents.

What is claimed is:

1. A system for optimizing the performance of a power plant comprising:
    (a) a communications network;
    (b) a plurality of remotely located data sources to provide power data, the power data including quantitative and qualitative data of one or more utility scale power generation units;
        wherein the quantitative data and qualitative data comprises (1) market data, (2) operational data, (3) alarms and (4) tracking of monitored recorded events based on numerical thresholds including megawatt (MW) levels, number of megawatts produced at a power generation facility, alerts when the megawatt level reaches a specific level, wherein each MW level reached requires a unique action or log entry to be recorded; and
    (c) a performance monitor in communication with the plurality of remotely located data sources through the communications network, the performance monitor including:
        (i) a communications unit to extract the power data from the plurality of remotely located data sources,
        (ii) a data conversion unit to transform the power data into a common data format,
        (iii) a data store to store the transformed power data, and
        (iv) a user interface unit to display the transformed power data on one or more client devices through the communications network, wherein the user interface unit includes a library of extensible markup language (XML) configuration files, each XML configuration file being associated with a corresponding one of interactive reports to map the power data stored in the data store directly to the corresponding interactive report for display on the one or more client devices.

2. The system of claim 1, wherein the quantitative data includes supervisory control and data acquisition (SCADA) data and/or market data.

3. The system of claim 1, wherein the quantitative data includes operational cost data of the one or more power generation units.

4. The system of claim 1, wherein the qualitative data includes event log data of the one or more power generation units.

5. The system of claim 1, wherein the communications unit includes a gateway application programming interface (API) unit to pull the power data from the plurality of remotely located data sources.

6. The system of claim 5, wherein the conversion unit includes an interface API unit to communicate with the gateway API unit and to transform the power data into the common data format.

7. The system of claim 1, wherein the user interface unit includes an alarm unit to issue and track the alarms based on user-defined events.

8. The system of claim 1, wherein the user interface unit includes a reporting unit to display the interactive reports on the one or more client devices.

9. The system of claim 8, wherein the reporting unit includes any one of a dashboard reporting interface, daily operational reporting interface, unit performance interface, ad-hoc SCADA query interface, and unit status communications interface.

10. A computer-implemented non-transitory computer readable medium comprising instructions stored therein for causing a computer processor to perform a method for optimizing the performance of a utility scale power plant comprising:

communicating with a plurality of remotely located data sources from a performance monitor via a communications network, the plurality of remotely located data sources providing power data including quantitative and qualitative data of one or more utility scale power generation units, wherein the quantitative data and qualitative data comprises (1) market data, (2) operational data, (3) alarms and (4) tracking of monitored recorded events based on numerical thresholds including megawatt (MW) levels, number of megawatts produced at a power generation facility, alerts when the megawatt level reaches a specific level, wherein each MW level reached requires a unique action or log entry to be recorded;

extracting the power data from the plurality of remotely located data sources;

transforming the extracted power data into a common data format using a data conversion unit;

storing the transformed power data in a data store; and displaying the transformed power data on one or more client devices through the communications network comprising a library of extensible markup language (XML) configuration files, each XML configuration file being associated with a corresponding one of interactive reports to map the power data stored in the data store directly to the corresponding interactive report for display on the one or more client devices.

11. The computer-implemented method of claim 10, wherein the quantitative data includes supervisory control and data acquisition (SCADA) data and/or market data.

12. The computer-implemented method of claim 10, wherein the quantitative data includes operational cost data of the one or more power generation units.

13. The computer-implemented method of claim 10, wherein the qualitative data includes event log data of the one or more power generation units.

14. The computer-implemented method of claim 10, wherein the step of extracting the power data from the remotely located data sources include pulling the power data from the plurality of remotely located data sources via a gateway application programming interface (API) unit.

15. The computer-implemented method of claim 14, wherein the step of transforming the power data includes converting the power data into the common data format via an interface API unit.

16. The computer-implemented method of claim 10, wherein the step of displaying includes issuing and tracking the alarms based on user-defined events.

17. The computer-implemented method of claim 10, wherein the step of displaying includes displaying the interactive reports on the one or more client devices.

18. The computer-implemented method of claim 17, wherein the interactive reports are displayed on any one of a dashboard reporting interface, daily operational reporting interface, unit performance interface, ad-hoc SCADA query interface, and unit status communications interface.

19. A non-transitory computer-readable storage medium, storing one or more programs configured for execution by one or more processors, comprising instructions stored therein for causing a computer processor to perform the one or more programs to:

communicate with a plurality of remotely located data sources from a performance monitor via a communications network, the plurality of remotely located data sources providing power data including quantitative and qualitative data of one or more utility scale power generation units, wherein the quantitative data and qualitative data comprises (1) market data, (2) operational data, (3) alarms and (4) tracking of monitored recorded events based on numerical thresholds including megawatt (MW) levels, number of megawatts produced at a power generation facility, alerts when the megawatt level reaches a specific level, wherein each MW level reached requires a unique action or log entry to be recorded;

extract the power data from the plurality of remotely located data sources;

transform the extracted power data into a common data format using a data conversion unit;

store the transformed power data in a data store; and display the transformed power data on one or more client devices through the communications network comprising a library of extensible markup language (XML) configuration files, each XML configuration file being associated with a corresponding one of interactive reports to map the power data stored in the data store directly to the corresponding interactive report for display on the one or more client devices.

* * * * *